United States Patent
Nomichi et al.

(10) Patent No.: US 8,960,221 B2
(45) Date of Patent: Feb. 24, 2015

(54) GAS PRESSURE REGULATING VALVE

(75) Inventors: Kaoru Nomichi, Ono (JP); Yutaka Suzuki, Kobe (JP); Makoto Ninomiya, Kobe (JP); Shoji Murakami, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 232 days.

(21) Appl. No.: 13/812,017

(22) PCT Filed: Aug. 4, 2011

(86) PCT No.: PCT/JP2011/004438
§ 371 (c)(1),
(2), (4) Date: Mar. 13, 2013

(87) PCT Pub. No.: WO2012/017667
PCT Pub. Date: Feb. 9, 2012

(65) Prior Publication Data
US 2013/0167950 A1 Jul. 4, 2013

(30) Foreign Application Priority Data

Aug. 6, 2010 (JP) ................. 2010-177868
Mar. 22, 2011 (JP) ................. 2011-063087

(51) Int. Cl.
*F16K 31/12* (2006.01)
*G05D 7/03* (2006.01)
(Continued)

(52) U.S. Cl.
CPC ............ *G05D 7/03* (2013.01); *F02M 21/0239* (2013.01); *F02M 21/0245* (2013.01);
(Continued)

(58) Field of Classification Search
USPC .................... 137/487, 487.5, 505.18, 505.14, 137/505.27, 505.42; 251/129.15, 129.07, 251/129.17, 129.21; 384/50
See application file for complete search history.

(56) References Cited

U.S. PATENT DOCUMENTS 4,700,891 A * 10/1987 Hans et al. ................. 239/132.5
6,725,876 B2 * 4/2004 Bowman et al. ............. 137/312
(Continued)

FOREIGN PATENT DOCUMENTS

JP      U-6-34143    5/1994
JP      A-9-269836   10/1997
(Continued)

OTHER PUBLICATIONS

International Search Report issued in International Patent Application No. PCT/JP2011/004438 mailed Aug. 30, 2011.

*Primary Examiner* — Craig Schneider
*Assistant Examiner* — Jessica Cahill
(74) *Attorney, Agent, or Firm* — Oliff PLC

(57) ABSTRACT

An electromagnetic pressure regulating valve includes a valve body and causes a valve body to move by an electromagnetic proportional solenoid to adjust an opening degree of a valve passage, thereby regulating secondary pressure to target pressure. A pressure return chamber is formed in the housing, and a diaphragm seal is provided at the valve body. The diaphragm seal receives the secondary pressure of the pressure return chamber to cause the valve body to move toward a closed position. A bearing member is provided between the valve body and the housing. In a gap between the valve body and the housing, a high-pressure sealing member is provided closer to the valve passage than the bearing member, and a low-pressure sealing member is provided closer to the bearing member than the high-pressure sealing member. A buffer chamber connected to a secondary port is formed between the sealing members.

13 Claims, 23 Drawing Sheets

(51) Int. Cl.
  *F02M 21/02* (2006.01)
  *F16K 31/06* (2006.01)
  *F16K 31/42* (2006.01)
  *G05D 16/20* (2006.01)
  *H01M 8/04* (2006.01)

(52) U.S. Cl.
  CPC ........ *F16K 31/0613* (2013.01); *F16K 31/0624* (2013.01); *F16K 31/42* (2013.01); *G05D 16/2013* (2013.01); *H01M 8/04201* (2013.01); *H01M 8/04208* (2013.01); *F16K 31/0655* (2013.01); *H01M 2250/20* (2013.01); *Y02T 10/32* (2013.01); *Y02E 60/50* (2013.01); *Y02T 90/32* (2013.01)
  USPC .............. 137/487.5; 137/505.18; 137/505.14; 251/129.21; 251/129.07

(56) References Cited

U.S. PATENT DOCUMENTS

| 2002/0036013 | A1* | 3/2002  | Inayama et al. | 137/487.5  |
| 2003/0219344 | A1* | 11/2003 | Sakai et al.   | 417/222.2  |
| 2006/0180207 | A1* | 8/2006  | Itano et al.   | 137/505.14 |
| 2007/0289638 | A1* | 12/2007 | Ishitoya et al.| 137/455    |
| 2009/0152485 | A1* | 6/2009  | Nomichi et al. | 251/129.01 |

FOREIGN PATENT DOCUMENTS

| JP | A-2002-243058 | 8/2002  |
| JP | A-2002-295709 | 10/2002 |
| JP | A-2004-245243 | 9/2004  |
| JP | A-2006-172123 | 6/2006  |
| JP | A-2007-188857 | 7/2007  |
| JP | A-2009-98961  | 5/2009  |
| JP | A-2011-52750  | 3/2011  |

* cited by examiner

GAS PRESSURE REGULATING VALVE

TECHNICAL FIELD

The present invention relates to a gas pressure regulating valve configured to regulate the pressure of a high-pressure fuel gas to pressure corresponding to an applied voltage or an applied current.

BACKGROUND ART

Clean energy vehicles using fuel gases, such as a hydrogen gas and a natural gas, are known, and examples thereof include fuel-cell vehicles, hydrogen engine vehicles, and natural gas vehicles. The clean energy vehicle includes a high-pressure tank and one of an injector and an electromagnetic pressure regulating valve and runs in such a manner that the fuel gas stored in the high-pressure tank is supplied by the injector or the electromagnetic pressure regulating valve to a fuel cell or a gas engine. Each of the injector and the electromagnetic pressure regulating valve can adjust the flow rate (or the pressure) of the fuel gas supplied to the fuel cell or the gas engine. The output of the fuel cell or the gas engine is controlled by adjusting the flow rate (or the pressure) of the fuel gas by the injector or the electromagnetic pressure regulating valve.

The injector can close and open an injection hole thereof to adjust the flow rate of the fuel gas. The injector changes the flow rate of the fuel gas by a ratio between an open time of the injection hole and a closed time of the injection hole, that is, a duty ratio. If differential pressure between upstream pressure of the injector and output pressure of the injector is high, the flow rate of the fuel gas which flows when the injection hole of the injector is opened is extremely high, and the change in the flow rate of the fuel gas with respect to the change in the duty ratio of the injector is significant. Especially, in a low flow rate region (the fuel cell or the gas engine is in a low load state), a flow gain (a value obtained by dividing the flow rate of the fuel gas by the duty ratio) is large, and the control operation is difficult. In addition, another problem is that if the upstream pressure of the injector increases, the span of duty control for changing from a low flow rate to a high flow rate becomes extremely narrow.

The electromagnetic pressure regulating valve can adjust the opening degree (opening area) of a valve passage to adjust the flow rate of the fuel gas. Therefore, if the upstream pressure of the electromagnetic pressure regulating valve increases, differential pressure between an upstream side and downstream side of the electromagnetic pressure regulating valve increases. On this account, the flow rate of the fuel gas significantly changes only by slightly increasing the opening degree, and the change in the flow rate of the fuel gas with respect to the change in the opening degree of the valve passage is significant. Therefore, as with the injector, in the electromagnetic pressure regulating valve, the pressure control of the fuel gas in the low flow rate region (low load state) is extremely difficult.

To solve such difficult problems, two regulators are provided upstream of an injector in a fuel cell system disclosed in PTL 1. These two regulators are arranged in series and reduce the pressure of a hydrogen gas in two stages, the hydrogen gas being supplied from a high-pressure tank. In the fuel cell system, the upstream pressure of the injector is maintained at certain low pressure or lower by the two regulators, so that differential pressure between an upstream side and downstream side of the injector is low. Thus, the pressure controllability is secured. The fuel cell system includes a shutoff valve provided upstream of the two regulators. The shutoff valve can shut off communication between the hydrogen tank and the fuel cell to stop the supply of the hydrogen gas.

CITATION LIST

Patent Literature

PTL 1: Japanese Laid-Open Patent Application Publication No. 2007-188857

SUMMARY OF INVENTION

Technical Problem

The fuel cell system described in PTL 1 requires a plurality of regulators in order to reduce the pressure of the fuel gas in multiple stages. However, if a plurality of regulators are provided, the number of components increases, and spaces for the regulators are required. Therefore, the size of the entire system increases, the cost increases, and the weight of the entire system increases. Especially, it is not preferable to install the above-described system in a vehicle in which spaces for components are limited and whose weight reduction is desired.

Moreover, by providing a plurality of regulators, the pressure loss of the system increases. Therefore, a service pressure limit of the high-pressure tank with respect to minimum working pressure of the fuel cell or the gas engine needs to be set to high pressure. In this case, the amount of fuel gas consumable in the high-pressure tank becomes smaller than that in a case where the regulators are not provided. Thus, the cruising distance of the vehicle decreases.

As above, the addition of a plurality of regulators causes various problems. Moreover, as described above, according to the conventional injector and the conventional electromagnetic pressure regulating valve, the pressure control of the fuel gas in the low load state is difficult when the upstream pressure of the conventional injector or the conventional electromagnetic pressure regulating valve is high.

Further, a diaphragm method may be used as a seal method of, for example, the electromagnetic pressure regulating valve. However, the pressure capacity of the diaphragm seal is generally small. Therefore, when handling the high-pressure fuel gas, the fuel gas may leak to the atmosphere by the failure of the diaphragm. In the case of an O ring method, the fuel gas may leak to the atmosphere by an unexpected external factor at the time of high pressure.

An object of the present invention is to provide a gas pressure regulating valve capable of even under a high-pressure fuel gas circumstance, more precisely regulate secondary pressure of the high-pressure fuel gas to target pressure and preventing the fuel gas from leaking to the atmosphere.

Solution to Problem

A gas pressure regulating valve of the present invention includes: a housing including a valve passage connected to a primary port and a secondary port; a valve body provided in the housing and configured to move between a closed position where the valve body closes the valve passage and an open position where the valve body opens the valve passage to adjust an opening degree of the valve passage; a return spring configured to bias the valve body in a direction toward the closed position; and a valve body driving unit configured to apply a driving force corresponding to an applied voltage or an applied current to the valve body against the biasing of the return spring to cause the valve body to move in a direction toward the open position, the gas pressure regulating valve being configured to regulate pressure of a high-pressure fuel gas, supplied through the primary port to the valve passage, to pressure corresponding to the driving force of the valve body driving unit to output the fuel gas through the secondary port, the gas pressure regulating valve including: a pressure return chamber formed in the housing and connected to the secondary port; a first sealing member configured to receive pressure of the pressure return chamber in a direction against the driving force and cause the valve body to move toward the closed position in accordance with the pressure of the pressure return chamber; a bearing member provided in a gap between the valve body and the housing and configured to slidingly support the valve body; a second sealing member provided closer to the valve passage than the bearing member and configured to seal the gap; and a third sealing member provided closer to the valve passage than the second sealing member and configured to seal the gap, wherein a buffer chamber connected to the secondary port is formed between the third sealing member and the second sealing member.

According to the present invention, by changing the driving force of the valve body driving unit, the opening degree of the valve passage is changed. Thus, the secondary pressure can be regulated. The secondary pressure is being introduced to the pressure return chamber, and the first sealing member receives the secondary pressure of the pressure return chamber to cause the valve body to move toward the closed position. When the secondary pressure decreases in a state where the forces, such as the secondary pressure, the driving force, and the biasing force of the return spring, acting on the valve body are balanced, the first sealing member causes the valve body to move toward the open position to increase the opening degree of the valve passage, thereby increasing the secondary pressure. With this, the state where the forces acting on the valve body are balanced is realized again. By realizing this balance state, the secondary pressure is returned to original pressure. To be specific, the secondary pressure is returned to certain pressure corresponding to the driving force of the valve body driving unit and is maintained at the certain pressure regardless of the change in the primary pressure. Therefore, the gas pressure regulating valve has high pressure controllability and can more precisely regulate the pressure of the high-pressure fuel gas to the target pressure.

In the present invention, the second sealing member is located closer to the bearing member than the third sealing member. Therefore, even if the fuel gas leaks through the third sealing member, the fuel gas does not leak to the bearing member side by the second sealing member. Further, the buffer chamber is formed between the third sealing member and the second sealing member and is connected to the secondary port. Therefore, even if the fuel gas leaks through the third sealing member, the fuel gas can flow into the buffer chamber to be introduced to the secondary side. As above, the gas pressure regulating valve has a safety structure by which the fuel gas having leaked through the third sealing member is introduced to the secondary side, and even if a space for accommodating the bearing member is connected to the outside, the fuel gas can be prevented from being discharged to the outside.

Further, in the present invention, by providing the bearing member, the valve body can be moved smoothly, and the followability with respect to the target pressure can be improved. Then, since the second sealing member is provided closer to the valve passage than the bearing member in the gap, the fuel gas does not flow to the bearing member, and the bearing member is not exposed to the fuel gas. With this, a material having no corrosion resistance to the fuel gas can be used as a material of the bearing member, and this increases material options. For example, in a case where the bearing member is lubricated with grease, the grease can be prevented from flowing out to the secondary port side together with the fuel gas. With this, the smooth movement of the valve body is realized, and the grease can be prevented from being mixed with the fuel gas.

In the above invention, it is preferable that the secondary port and the pressure return chamber be connected to each other by a pressure return passage, and the pressure return passage be formed in the valve body.

According to the above configuration, it becomes unnecessary to form the pressure return passage in the housing. Thus, the stiffness of the housing is improved, and the fuel gas can be prevented from leaking to the atmosphere.

As another mode of the present invention, it is preferable that the secondary port and the pressure return chamber be connected to each other by a pressure return passage, and the pressure return passage be formed in the housing.

According to the above configuration, since it becomes unnecessary to form a passage in the valve body, the diameter of the valve body can be reduced. With this, the gas pressure regulating valve itself can be reduced in size.

In the above invention, it is preferable that the pressure return passage be connected to the buffer chamber.

According to the above configuration, the fuel gas having leaked to the buffer chamber can be introduced through the pressure return passage to the secondary side. With this, it becomes unnecessary to form a passage other than the pressure return passage, and the valve body and the housing can be reduced in size. To be specific, the gas pressure regulating valve can be reduced in size.

In the above invention, it is preferable that the housing include a valve seat portion on which the valve body is seated when the valve body is located at the closed position, the valve seat portion including a valve seat surface perpendicular to the direction toward the open position, and a valve body surface of the valve body be seated on the valve seat surface, the valve body surface being perpendicular to the direction toward the open position.

According to the above configuration, both the valve seat surface of the valve seat portion and the valve body surface of the valve body are perpendicular to the direction toward the open position. Therefore, even if the valve seat portion or the valve body deforms over time by repeated use, plastic deformation in the direction toward the open position occurs. On this account, a seat diameter changes little by the repeated use, and the pressure regulating performance does not change. Thus, the reliability and the stability of the pressure regulating performance can be improved.

In the above invention, it is preferable that the valve passage include a secondary passage connected to the secondary port located downstream of an orifice formed between the valve seat portion and the valve body, and the valve body driving unit be provided outside the secondary passage to be located on an opposite side of the valve seat portion such that the valve body driving unit and the valve seat portion sandwich the valve body, and the valve body driving unit pull up the valve body by the driving force to cause the valve body to move in the direction toward the open position.

According to the above configuration, the electromagnetic gas pressure regulating valve is configured to have a pull-type structure capable of sandwiching the valve body by the valve body driving unit and pulling the valve body from an opposite side of the valve body surface to cause the valve body to move in the direction toward the open position. Therefore, the valve body driving unit can be provided outside the secondary passage located on the valve body surface side of the valve body. With this, while securing the same passage area of the secondary passage as a push-type structure electromagnetic pressure regulating valve configured such that the valve body driving unit is provided at the secondary passage and the valve body is pushed in the direction toward the open position, the diameter of the orifice (that is, the seat diameter) can be made smaller than that of the push-type structure electromagnetic pressure regulating valve. By making the seat diameter smaller as above, the change in the opening degree of the valve passage with respect to the stroke of the valve body can be reduced. Therefore, the electromagnetic pressure regulating valve can adjust the opening degree of the valve passage more precisely than the push-type structure electromagnetic gas pressure regulating valve. Thus, the stability of the pressure regulating accuracy of the electromagnetic gas pressure regulating valve can be improved.

In the above invention, it is preferable that: the valve seat portion be formed along an outer edge of a valve port that is an opening of the secondary passage, the opening being located on the primary port side, and project toward the valve body in the direction toward the open position; the valve body include a seat member located at a position opposed to the valve seat portion; and one surface of the seat member form the valve body surface, and the valve body surface be seated on a top portion of the valve seat portion.

According to the above configuration, since the valve body is a moving member, a seating position of the valve body varies. Herein, the valve seat portion is projecting. Therefore, even if the seating position varies to some extent, the valve body can be surely seated on the valve seat portion by making the valve body surface of the valve body larger. In addition, since the valve seat portion is formed along the outer edge of the valve port, the inner diameter of the valve port and the inner diameter of the valve seat portion can be set to be substantially equal to each other. With this, the seat diameter can be reduced while securing the necessary passage area, and the stability of the pressure regulating accuracy of the electromagnetic gas pressure regulating valve can be improved.

In the above invention, it is preferable that the valve body be formed such that a pressure receiving area of a first pressure receiving surface configured to receive primary pressure of the primary port toward the open position and a pressure receiving area of a second pressure receiving surface configured to receive the primary pressure toward the closed direction are equal to each other.

According to the above configuration, the acting force generated by the primary pressure received by the valve body can be canceled. With this, the change in the secondary pressure due to the change in the primary pressure can be eliminated, and the pressure controllability of the secondary pressure can be further improved. In addition, the driving force of the valve body driving unit can be reduced. Therefore, the gas pressure regulating valve can be reduced in size.

In the above invention, it is preferable that the valve body be formed such that a pressure receiving area of a first pressure receiving surface configured to receive primary pressure of the primary port toward the open position is smaller than a pressure receiving area of a second pressure receiving surface configured to receive the primary pressure toward the closed direction.

According to the above configuration, the valve body receives the acting force generated by the primary pressure in the direction toward the closed position. With this, even if the primary pressure drastically changes and increases, the valve body does not move toward the open position and does not open the valve passage. In addition, since the valve body receives the acting force generated by the primary pressure in the direction toward the closed position, the valve body is held at the closed position when the valve body driving unit is not operating. Therefore, the valve passage can be closed firmly, and the fuel gas can be prevented from leaking from the primary side to the secondary side when the valve body driving unit is not operating.

In the above invention, it is preferable that the pressure return chamber be provided on an opposite side of the second sealing member such that the pressure return chamber and the second sealing member sandwich the bearing member, and the first sealing member be located between the bearing member and the pressure return chamber to seal between the bearing member and the pressure return chamber.

According to the above configuration, the fuel gas introduced to the pressure return chamber can be prevented from flowing toward the bearing member by the first sealing member. With this, material options for the bearing member increases, and even if the bearing member is lubricated with grease, the grease is prevented from being mixed with the fuel gas.

As another mode of the present invention, it is preferable that the pressure return chamber be located between the valve passage and the valve body driving unit, and the first sealing member be located between the valve body driving unit and the pressure return chamber to seal between the valve body driving unit and the pressure return chamber.

According to the above configuration, the fuel gas can be prevented from flowing toward the valve body driving unit side. With this, the valve body driving unit can be prevented from being exposed to the fuel gas, and in a case where the fuel gas is a corrosive fluid, components of the valve body driving unit can be prevented from corroding. In addition, even if the valve body driving unit is provided in the atmosphere, the fuel gas can be prevented from flowing through the valve body driving unit to the atmosphere.

In the above invention, it is preferable that the first sealing member be a diaphragm seal, and the second sealing member be a low-pressure seal which is low in frictional resistance.

According to the above configuration, by adopting the diaphragm seal as the first sealing member, the sliding friction by the first sealing member can be eliminated. In addition, by adopting as the second sealing member the low-pressure seal which is low in the frictional resistance, the sliding friction can be reduced. With this, the valve body can be moved smoothly, and the secondary pressure can be quickly regulated to certain pressure corresponding to the driving force when the primary pressure has changed, when the driving force is changed, or the like. Therefore, the responsiveness of the secondary pressure can be improved.

In the above invention, it is preferable that the third sealing member be a high-pressure seal which is low in frictional resistance and in which a difference between starting resistance and sliding resistance is small.

According to the above configuration, the valve body can be moved smoothly, and the responsiveness of the valve body can be improved. In addition, since the third sealing member is a high-pressure seal, the pressure resistance to the primary pressure is improved, and the limit pressure of the primary pressure supplied from the primary port can be improved.

In the above invention, it is preferable that the gas pressure regulating valve be a normally closed valve configured such that when the applied voltage or the applied current applied to the valve body driving unit is zero, the valve body is located at the closed position by the return spring.

According to the above configuration, the valve passage can be urgently shut off by shutting off the supply of the applied voltage or the applied current applied to the valve body driving unit.

Advantageous Effects of Invention

The present invention can provide a gas pressure regulating valve capable of, even under a high-pressure fuel gas circumstance, more precisely regulating secondary pressure of the high-pressure fuel gas to target pressure and preventing a fuel gas from leaking to the atmosphere.

DESCRIPTION OF EMBODIMENTS

Figure 1:
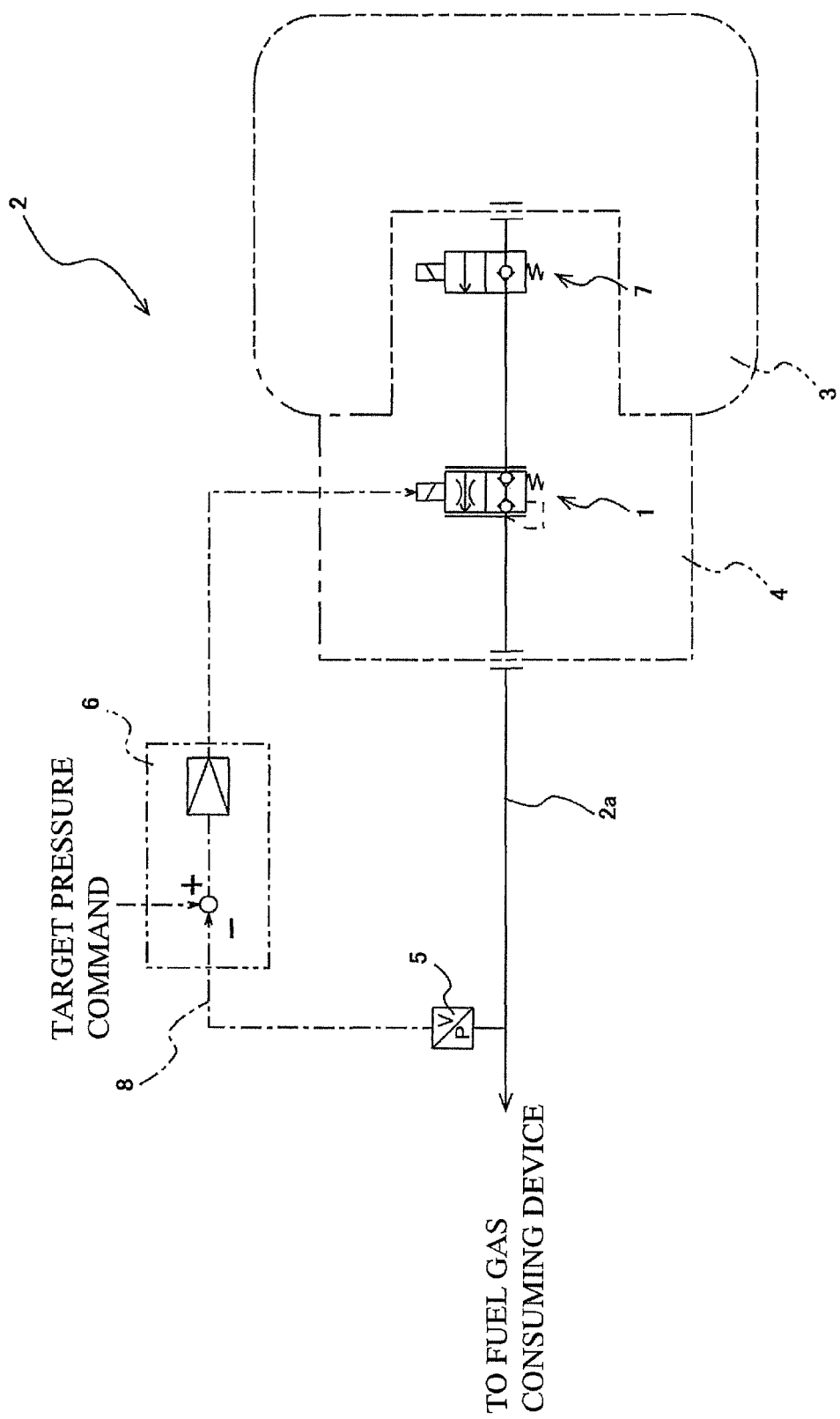
FIG. 1 is a circuit diagram showing the configuration of a fuel gas supply system including an electromagnetic pressure regulating valve of Embodiment 1.

Hereinafter, pressure regulating valves 1 and 1A to 1V according to Embodiments 1 to 22 of the present invention and a fuel gas supply systems 2 including the pressure regulating valve will be explained in reference to the drawings. In the embodiments, the concept of directions, such as upper, lower, left, right, front, and rear directions, is used for convenience of explanation and does not indicate that the configurations, arrangements, directions, and the like of the pressure regulating valves 1 and 1A to 1V and the fuel gas supply system 2 are limited to the directions. In addition, each of the pressure regulating valves 1 and 1A to 1V and the fuel gas supply system 2 is just one embodiment of the present invention, and the present invention is not limited to the embodiments. Additions, eliminations, and modifications may be made within the scope of the present invention.

Fuel Gas Supply System

A fuel gas supply system 2 is provided at a high-pressure tank 3 configured to store a fuel gas, such as a hydrogen gas or a compressed natural gas, at high pressure. The fuel gas supply system 2 is connected to a fuel gas consuming device, such as a fuel cell or a gas engine, and regulates the pressure of the high-pressure fuel gas to desired low pressure to supply the fuel gas to the fuel gas consuming device. The fuel gas supply system 2 configured as above includes a container master valve 4, a pressure sensor 5, and a calculation controller 6. The container master valve 4 is constituted by an on tank type and is provided at an opening portion of the high-pressure tank 3. The container master valve 4 is not limited to the on tank type and may be constituted by an in tank type. The container master valve 4 includes an electromagnetic pressure regulating valve 1 and an electromagnetic shutoff valve 7.

The electromagnetic shutoff valve 7 is provided on a supply passage 2a connecting the high-pressure tank 3 and the fuel gas consuming device. The electromagnetic shutoff valve 7 is a so-called electromagnetic on-off valve and opens and closes the supply passage 2a in accordance with a signal transmitted thereto. In addition, the electromagnetic pressure regulating valve 1 is provided on the supply passage 2a so as to be located downstream of the electromagnetic shutoff valve 7. The electromagnetic pressure regulating valve 1 regulates the pressure of the high-pressure fuel gas. Further, the pressure sensor 5 is provided on the supply passage 2a so as to be located downstream of the electromagnetic pressure regulating valve 1. The pressure sensor 5 detects the pressure of the fuel gas flowing through the supply passage 2a. The pressure sensor 5 is connected to the calculation controller 6 through a signal wire 8, and a detected pressure signal corresponding to the detected pressure is input to the calculation controller 6. In addition, a target pressure command signal corresponding to target pressure is input to the calculation controller 6 from an input unit, a control device, or the like, not shown.

The calculation controller 6 calculates a difference between the target pressure command signal and the detected pressure signal and supplies to the electromagnetic pressure regulating valve 1 a current having a magnitude corresponding to this difference. The electromagnetic pressure regulating valve 1 regulates the pressure of the high-pressure fuel gas to certain pressure corresponding to the supplied current. Hereinafter, the electromagnetic pressure regulating valve 1 provided in the fuel gas supply system 2 will be explained in detail. Here, the electromagnetic pressure regulating valve 1 of Embodiment 1 is just one example of the electromagnetic pressure regulating valve provided in the fuel gas supply system 2, and there are various embodiments. Hereinafter, the electromagnetic pressure regulating valve 1 of Embodiment 1 and some typical embodiments will be explained in detail.

Embodiment 1

Configuration of Electromagnetic Pressure Regulating Valve

Figure 2:
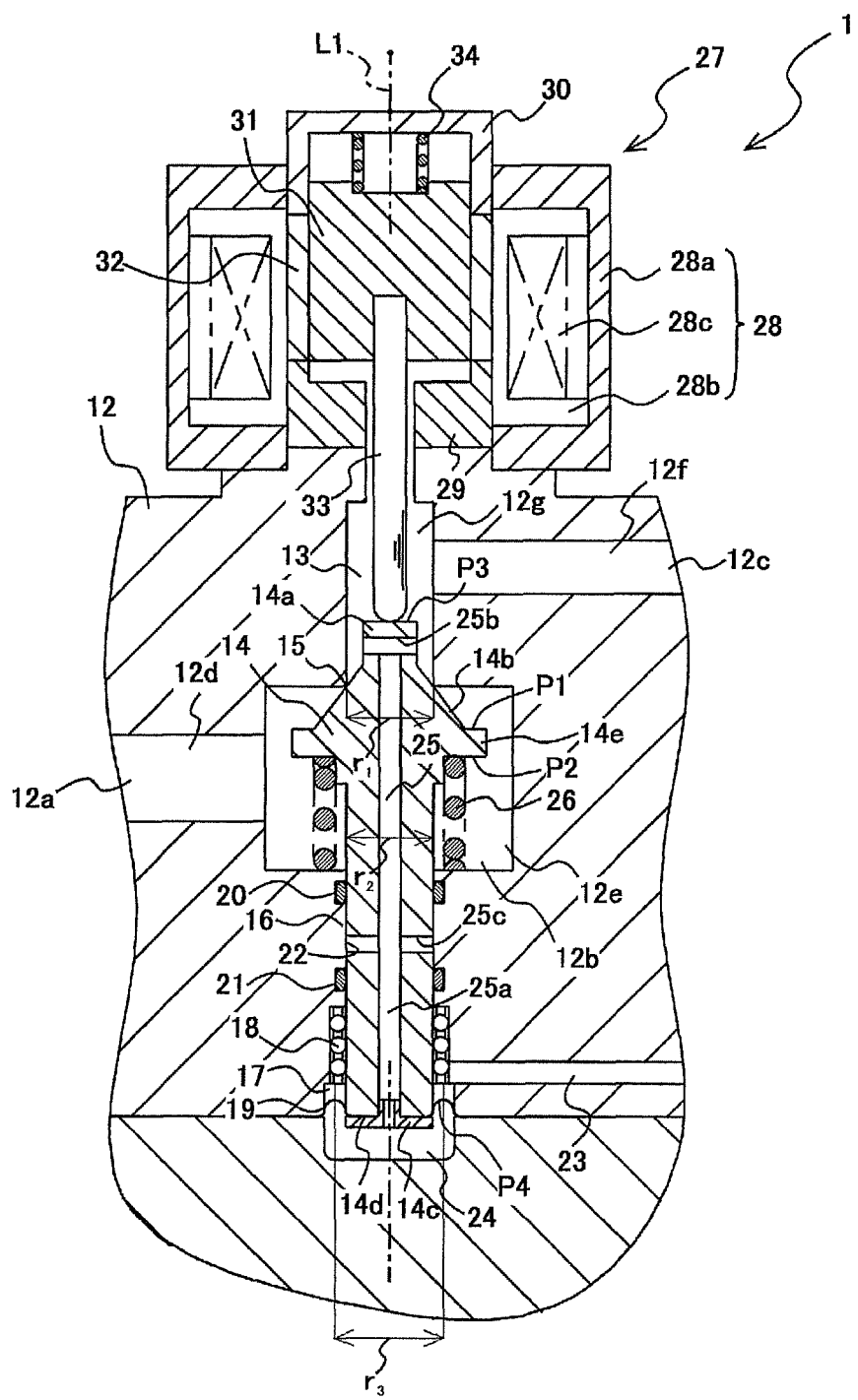
FIG. 2 is a cross-sectional view showing the configuration of the electromagnetic pressure regulating valve of Embodiment 1.

The electromagnetic pressure regulating valve 1 of Embodiment 1 shown in FIG. 2 includes a housing 12. The housing 12 is attached to an opening portion of the high-pressure tank 3 (see FIG. 1) in a sealed state. The housing 12 includes a primary port 12a, a valve body hole 12b, and a secondary port 12c. The primary port 12a is connected to the electromagnetic shutoff valve 7 (see FIG. 1) and is connected to the valve body hole 12b through a primary passage 12d formed in the housing 12.

The valve body hole 12b extends along an axis line L1 extending in the upper-lower direction. A lower side of the valve body hole 12b is closed, and an upper side thereof is open. The valve body hole 12b has a circular cross section and includes a valve space 12e at an intermediate portion thereof, the valve space 12e being larger in diameter than the other portion of the valve body hole 12b. The primary passage 12d is connected to the valve space 12e. The valve body hole 12b is connected to the secondary port 12c through a secondary passage 12f formed in the housing 12. The secondary passage 12f is connected to the valve body hole 12b at a secondary region 12g located on an upper side of the valve space 12e. The secondary port 12c is connected to the fuel gas consuming device through the supply passage 2a (see FIG. 1). As above, the primary port 12a and the secondary port 12c are connected to each other through the primary passage 12d, the valve space 12e, the secondary region 12g, and the secondary passage 12f. The primary passage 12d, the valve space 12e, the secondary region 12g, and the secondary passage 12f constitute a valve passage 13 connecting the primary port 12a and the secondary port 12c.

The housing 12 configured as above includes a seat portion 15. The seat portion 15 is located in the vicinity of an opening connecting the secondary region 12g and the valve space 12e and is formed to surround this opening. A valve body 14 is inserted in the housing 12 along the axis line L1 of the valve body hole 12b. The valve body 14 is seated (pressed) on the seat portion 15 such that a tip end portion (to be specific, an upper end portion) 14a thereof is inserted in the secondary region 12g. The valve body 14 has a substantially columnar shape and includes a tapered portion 14b on the tip end portion 14a side. The tapered portion 14b has a tapered shape toward an upper side. When the valve body 14 is located at a closed position as shown in FIG. 2, the valve body 14 is seated on the seat portion 15 to close the valve passage 13. A portion of the valve body 14 located on a lower end 14d side of the tapered portion 14b has an outer diameter that is substantially equal to an inner diameter of the secondary region 12g.

The housing 12 includes a seal attaching portion 16 located below the valve space 12e. The seal attaching portion 16 is formed on an inner surface of the housing 12 along the entire periphery in the circumferential direction. An inner diameter of the seal attaching portion 16 is substantially equal to each of a hole diameter of the secondary region 12g and an outer diameter of the valve body 14. An inner diameter of a portion of the housing 12 located below the seal attaching portion 16 is larger than the inner diameter of the seal attaching portion 16. With this, a bearing member accommodating space 17 having a substantially annular shape is formed between the housing 12 and the valve body 14, and a bearing member 18 is accommodated in the bearing member accommodating space 17.

The bearing member 18 is formed to have a substantially cylindrical shape and is constituted by a ball guide, a ball bearing, a slide bearing, or the like. The bearing member 18 is externally attach to the valve body 14, interposed between the valve body 14 and the housing 12, and supports the valve body 14. By the bearing member 18, the valve body 14 can move smoothly in the housing 12 along the axis line L1 in the upper-lower direction. In order to further smoothen the movement of the valve body 14 and improve the durability of the bearing member 18, the bearing member 18 is lubricated with grease.

In order to seal the bearing member accommodating space 17, a diaphragm seal 19 is provided on a lower side of the bearing member accommodating space 17 in which the bearing member 18 is provided as above. The diaphragm seal 19 that is a first sealing member is a so-called diaphragm and has a substantially annular shape. An outer edge portion of the diaphragm seal 19 is attached to the housing 12, and an inner edge portion thereof is attached to the valve body 14. More specifically, the housing 12 is configured to be separable into two parts that are upper and lower portions. The diaphragm seal 19 is attached to the housing 12 such that the outer edge portion of the diaphragm seal 19 is sandwiched between the upper and lower portions of the housing 12. In addition, the diaphragm seal 19 is attached to the valve body 14 such that the inner edge portion of the diaphragm seal 19 is sandwiched between a lower end portion of the valve body 14 and an attaching member 14c attached to the lower end portion of the valve body 14. A high-pressure sealing member 20 is provided at the seal attaching portion 16 of the housing 12 in order to seal the upper side of the bearing member accommodating space 17.

The high-pressure sealing member 20 that is a third sealing member is a high-pressure seal which is low in frictional resistance and in which a difference between starting resistance and sliding resistance is small. One example of the high-pressure sealing member 20 is an O ring subjected to a surface treatment by, for example, fluorocarbon resin. The high-pressure sealing member 20 is attached so as to be fitted in an inner peripheral portion of the seal attaching portion 16 and seals a gap between the valve body 14 and the seal attaching portion 16. In addition, a low-pressure sealing member 21 is provided at the seal attaching portion 16.

The low-pressure sealing member 21 that is a second sealing member is an O ring having a substantially annular shape and is subjected to a surface treatment by, for example, resin in order to reduce the frictional resistance. The low-pressure sealing member 21 is located closer to the bearing member 18 than the high-pressure sealing member 20 and is attached so as to be fitted in the inner peripheral portion of the seal attaching portion 16. The low-pressure sealing member 21 seals a gap between the seal attaching portion 16 and the valve body 14, and a buffer chamber 22 is formed between the high-pressure sealing member 20 and the low-pressure sealing member 21.

The buffer chamber 22 reduces the pressure difference between the upper side and lower side of the high-pressure sealing member 20 to prevent the leakage from the periphery of the high-pressure sealing member 20 and stores the fuel gas having leaked from the periphery of the high-pressure sealing member 20 when the valve body 14 has moved. Since the low-pressure sealing member 21 seals between the buffer chamber 22 and the bearing accommodating space 17, the stored fuel gas does not leak to the bearing accommodating space 17. The high-pressure sealing member 20 and the low-pressure sealing member 21 may be attached so as to be fitted in an outer peripheral portion of the valve body 14.

The bearing member accommodating space 17 whose upper and lower sides are respectively sealed by the diaphragm seal 19 and the low-pressure sealing member 21 is shut off and separated from other spaces (for example, the valve space 12e and the secondary region 12g) formed in the housing 12. The bearing member accommodating space 17 separated as above is open to the atmosphere through an atmosphere communication passage 23 formed in the housing 12. Therefore, the grease for lubricating the bearing member 18 is not exposed to the fuel gas and does not leak to the other spaces, such as the valve space 12e and the secondary port 12c, formed in the housing 12. Therefore, the grease can be prevented from drying up, and a good lubrication state of the bearing member 18 can be maintained. With this, the durability of the bearing member 18 can be improved, and the valve body 14 can be moved smoothly. In addition, the grease can be prevented from being mixed with the fuel gas.

A pressure return chamber 24 is formed at a portion of the valve body hole 12b, the portion being located on a lower side of the diaphragm seal 19. The pressure return chamber 24 is a substantially disc-shaped space surrounded by a bottom portion of the housing 12, the diaphragm seal 19, and the lower end portion of the valve body 14. The diaphragm seal 19 is located between the pressure return chamber 24 and the bearing member accommodating space 17 and seals therebetween. The pressure return chamber 24 is connected to the secondary region 12g of the valve passage 13 through a pressure equalizing passage 25.

The pressure equalizing passage 25 is formed in the valve body 14 and includes a return chamber communication portion 25a, a secondary side communication portion 25b, and a return portion 25c. The return chamber communication portion 25a is open to the pressure return chamber 24 and extends along an axis (which substantially coincides with the axis line L1 in the present embodiment) of the valve body 14 from the pressure return chamber 24 up to the tip end portion 14a. The return chamber communication portion 25a is connected to the secondary side communication portion 25b formed at the tip end portion 14a of the valve body 14. The secondary side communication portion 25b extends so as to penetrate the valve body 14 in the radial direction, and both ends thereof are open to the secondary region 12g. The return portion 25c penetrates the valve body 14 in the radial direction and is connected to the return chamber communication portion 25a in the valve body 14, and both ends of the return portion 25c are open to the buffer chamber 22. With this, the buffer chamber 22 is connected to the pressure return chamber 24 and the secondary region 12g through the pressure equalizing passage 25.

As above, the pressure equalizing passage 25 connects the secondary port 12c and the pressure return chamber 24 and supplies secondary pressure $p_2$ to the pressure return chamber 24. The pressure equalizing passage 25 also connects the secondary port 12c and the buffer chamber 22 and introduces the fuel gas, having leaked to the buffer chamber 22, to the pressure return chamber 24 and the secondary port 12c. That is, the fuel gas stored in the buffer chamber 22 returns to the secondary region 12g through the pressure equalizing passage 25. To be specific, the electromagnetic pressure regulating valve 1 is configured as a valve having a safety structure by which the fuel gas having leaked from a primary region, such as the valve space 12e, can be returned to a secondary region without causing the leakage to the outside. Since the difference between the secondary pressure $p_2$ and the atmospheric pressure is small, the leakage from the periphery of the low-pressure sealing member 21 to the bearing member accommodating space 17 occurs rarely. Therefore, the secondary pressure $p_2$ of the buffer chamber 22 can be prevented from leaking to the atmosphere.

The valve body 14 includes a flange 14e. The flange 14e is formed below the tapered portion 14b along the entire periphery of the valve body 14 in the circumferential direction and projects further from the tapered portion 14b in a radially outward direction. The flange 14e is located so as to be opposed to an upper end of the seal attaching portion 16. A return spring 26 is provided between the flange 14e and the upper end of the seal attaching portion 16. The return spring 26 is a so-called compression coil spring, is externally attached to the valve body 14 in a compressed state, and biases the valve body 14 in a direction toward the closed position (in such a direction that the valve body 14 moves toward the closed position). The biased valve body 14 is seated on the seat portion 15 to close the valve passage 13. An electromagnetic proportional solenoid 27 is provided at an opening end portion (that is, an upper end portion) of the housing 12 in order to apply to the valve body 14 a force against the biasing of the return spring 26.

The electromagnetic proportional solenoid 27 that is a valve body driving unit is threadedly engaged with and fixed to an outer periphery of the opening end portion of the housing 12. The electromagnetic proportional solenoid 27 includes a solenoid coil 28. The solenoid coil 28 is formed to have a substantially cylindrical shape, and the housing 12 is fittingly inserted in a lower end side of the solenoid coil 28. The solenoid coil 28 includes a substantially cylindrical case 28a, and a bobbin 28b and a coil wire 28c are provided in the case 28a. The bobbin 28b is formed to also have a substantially cylindrical shape. The solenoid coil 28 is constituted by winding the coil wire 28c around the bobbin 28b. A yoke 29 is provided in the solenoid coil 28 to be located at a lower end portion of the solenoid coil 28, and an upper end portion of the solenoid coil 28 is closed by a cover 30. A movable member 31 is provided between the yoke 29 and the cover 30.

The movable member 31 is made of a magnetic material and is formed to have a substantially columnar shape. The movable member 31 is provided along the axis line L1. An outer diameter of the movable member 31 is smaller than an inner diameter of the solenoid coil 28, and a guide member 32 having an annular shape is interposed between the movable member 31 and the solenoid coil 28. The guide member 32 is made of a non-magnetic material and supports the movable member 31 such that the movable member 31 can slide along the axis line L1 in the upper-lower direction. The yoke 29 is opposed to a lower end portion of the movable member 31 in the upper-lower direction so as to be spaced apart from the lower end portion of the movable member 31. The yoke 29 is made of a magnetic material, such as electromagnetic stainless steel, and is formed to have a substantially annular shape. The yoke 29 is magnetized by supplying a current to the solenoid coil 28 and attracts the movable member 31.

A compression coil spring 34 is provided between an upper end portion of the movable member 31 and the cover 30. The movable member 31 is being biased toward the valve body 14 by the compression coil spring 34. A pushing member 33 is provided at the lower end portion of the movable member 31. The pushing member 33 extends along the axis line L1 and is inserted through the yoke 29. A base end portion of the pushing member 33 is fixed to the movable member 31. A tip end of the pushing member 33 is formed to have a partially spherical shape. The pushing member 33 is biased by the compression coil spring 34 via the movable member 31, and the tip end thereof is pressed on and contacts the tip end portion 14a of the valve body 14. By supplying the current to the solenoid coil 28, the movable member 31 is attracted toward the yoke 29, and the pushing member 33 provided as above pushes the valve body 14 in a direction toward an open position by a force corresponding to the supplied current. Thus, the valve passage 13 opens.

In the electromagnetic pressure regulating valve 1 configured as above, the tapered portion 14b of the valve body 14 and an upper surface of the flange 14e of the valve body 14 (that is, a pressure receiving surface P1 corresponding to a first pressure receiving surface) receive primary pressure $p_1$, having been introduced from the high-pressure tank 3 to the valve space 12e, in the direction toward the open position, and a lower surface of the flange 14e (that is, a pressure receiving surface P2 corresponding to a second pressure receiving surface) receives the primary pressure $p_1$ in the direction toward the closed position. The pressure receiving surface P1 is a region on the tapered surface in plan view, the region being located on a radially outer side of the secondary region 12g. The primary pressure $p_1$ applied to the pressure receiving surface P1 and the primary pressure $p_1$ applied to the pressure receiving surface P2 respectively act in directions opposite to each other and cancel each other. The pressure receiving areas of the pressure receiving surfaces P1 and P2 are substantially equal to each other since an outer diameter of a portion of the valve body 14 and the inner diameter (to be specific, a seat diameter) of the secondary region 12g are substantially equal to each other, the portion being located on the lower end 14d side of the flange 14e. Therefore, an acting force generated by the primary pressure $p_1$ received by the pressure receiving surface P1 and an acting force generated by the primary pressure $p_1$ received by the pressure receiving surface P2 cancel each other, so that influences due to the change in the primary pressure $p_1$ on the valve body 14 can be prevented.

In the electromagnetic pressure regulating valve 1, a tip end of the valve body 14 and a tapered surface of the tapered portion 14b (that is, a pressure receiving surface P3) receive in the direction toward the open position the secondary pressure $p_2$ flowing in the secondary region 12g, and the diaphragm seal 19 and the lower end 14d of the valve body 14 (that is, a pressure receiving surface P4) receive in the direction toward the closed position the secondary pressure $p_2$ introduced to the pressure return chamber 24. The pressure receiving surface P4 is a region overlapping the secondary region 12g in plan view. The secondary pressure $p_2$ applied to the pressure receiving surface P3 and the secondary pressure $p_2$ applied to the pressure receiving surface P4 respectively act in directions opposite to each other. However, the valve body 14 has an outer diameter $r_2$ substantially equal to a seat diameter $r_1$, and an effective diameter $r_3$ of the diaphragm seal 19 is larger than each of the seat diameter $r_1$ and the outer diameter $r_2$ of the valve body 14. Therefore, the pressure receiving area of the pressure receiving surface P4 configured to receive the secondary pressure $p_2$ in the direction toward the closed position is larger than that of the pressure receiving surface P3 configured to receive the secondary pressure $p_2$ in the direction toward the open position by an effective area of the diaphragm seal 19. With this, an acting force generated by the secondary pressure $p_2$ received by the pressure receiving surface P3 and an acting force generated by the secondary pressure $p_2$ received by the pressure receiving surface P4 do not completely cancel each other, and an acting force corresponding to the difference between the pressure receiving areas of the pressure receiving surfaces P3 and P4 acts on the valve body 14 in the direction toward the closed position. In addition, the valve body 14 is biased by the return spring 26 in the direction toward the closed position to be seated on the seat portion 15. As above, the valve body 14 is biased by the return spring 26 and the acting force generated by the secondary pressure $p_2$ in the direction toward the closed position. Thus, the electromagnetic pressure regulating valve 1 is constituted as a normally closed valve. With this, the valve passage 13 can be urgently shut off by shutting off the supply of the current to the solenoid coil 28.

Operations of Electromagnetic Pressure Regulating Valve

Hereinafter, operations of the electromagnetic pressure regulating valve 1 will be explained in reference to FIG. 2. When the current is supplied to the solenoid coil 28, a magnetizing force (driving force) acts on the movable member 31, and the movable member 31 is attracted toward the yoke 29. With this, the valve body 14 is pushed by the pushing member 33 in the direction toward the open position to be separated from the seat portion 15. Then, the valve passage 13 opens, and the fuel gas in the valve space 12e flows to the secondary region 12g. At this time, by an orifice (not shown) formed between the valve body 14 and the seat portion 15, the pressure of the fuel gas flowing from the valve space 12e to the secondary region 12g is reduced to the secondary pressure $p_2$. As above, the electromagnetic pressure regulating valve 1 is configured such that when the current is supplied to the solenoid coil 28, the valve body 14 is pushed by the pushing member 33, and the valve passage opens (that is, the electromagnetic pressure regulating valve 1 is a push-type electromagnetic pressure regulating valve).

The fuel gas in the secondary region 12g flows through the secondary passage 12f to be discharged through the secondary port 12c and also flows through the pressure equalizing passage 25 to be introduced to the pressure return chamber 24. The diaphragm seal 19 receives the secondary pressure $p_2$ of the fuel gas introduced to the pressure return chamber 24. The valve body 14 moves up to a position where the magnetizing force received by the movable member 31, the acting force generated by the secondary pressure $p_2$ received by the pressure receiving surface P3, the acting force generated by the secondary pressure $p_2$ received by the pressure receiving surface P4, and the spring force of the return spring 26 are balanced. To be specific, in order to balance the above forces, the opening degree of the valve passage 13 (to be specific, the opening degree of the orifice) is adjusted. Thus, the secondary pressure $p_2$ of the fuel gas flowing to the secondary region 12g is adjusted. With this, the secondary pressure P2 becomes pressure (to be specific, target pressure) corresponding to the current supplied to the solenoid coil 28.

For example, in a case where the secondary pressure $p_2$ is lower than the target pressure, the magnetizing force is higher than the acting force generated by the secondary pressure $p_2$, and the valve body 14 moves in a direction away from the seat portion 15, that is, in the direction toward the open position. The valve body 14 moves up to a position where the acting force generated by the secondary pressure $p_2$, the magnetizing force, and the spring force of the return spring 26 are balanced. With this, the opening degree of the valve passage 13 increases, and the secondary pressure $p_2$ increases. Thus, the secondary pressure $p_2$ is regulated to the target pressure. Therefore, even if the primary pressure $p_1$ changes, the electromagnetic pressure regulating valve 1 can control the opening degree of the valve passage 13 in accordance with the change in the primary pressure $p_1$ to regulate the secondary pressure $p_2$ to the target pressure. On this account, even if the primary pressure $p_1$ is not reduced to certain pressure in advance, the pressure of the high-pressure fuel gas can be reduced and regulated up to the low target pressure only by the electromagnetic pressure regulating valve 1. Therefore, the electromagnetic pressure regulating valve 1 is high in pressure controllability.

In the electromagnetic pressure regulating valve 1, since the pressure receiving areas of the pressure receiving surface P1 and the pressure receiving surface P2 are substantially the same as each other, the acting forces generated by the primary pressure $p_1$ received by the valve body 14 cancel each other. With this, the change in the secondary pressure $p_2$ due to the change in the primary pressure $p_1$ can be suppressed. Therefore, the pressure controllability with respect to the high-pressure fuel gas can be improved, and the electromagnetic pressure regulating valve 1 can control the secondary pressure $p_2$ more precisely than the conventional electromagnetic pressure regulating valves. By canceling the acting forces generated by the primary pressure $p_1$, the magnetizing force of the electromagnetic proportional solenoid 27 can be reduced, and the electromagnetic pressure regulating valve 1 can be reduced in size.

In the electromagnetic pressure regulating valve 1, the differential pressure between the primary pressure $p_1$ and the secondary pressure $p_2$ is high. Therefore, when the valve body 14 moves, the fuel gas slightly leaks from the valve space 12e through the high-pressure sealing member 20 to the buffer chamber 22 in some cases. However, in the electromagnetic pressure regulating valve 1, the low-pressure sealing member 21 is located closer to the bearing member accommodating space 17 than the high-pressure sealing member 20. Therefore, even if the fuel gas leaks through the high-pressure sealing member 20, the fuel gas does not leak to the bearing member accommodating space 17 by the low-pressure sealing member 21. Further, the buffer chamber 22 is connected through the pressure equalizing passage 25 to the pressure return chamber 24, the secondary region 12g, and the like, and the electromagnetic pressure regulating valve 1 has the safety structure by which the fuel gas having leaked through the high-pressure sealing member 20 is returned to the secondary side. Therefore, the fuel gas having leaked through the high-pressure sealing member 20 is not discharged to the outside of the electromagnetic pressure regulating valve 1. To be specific, the fuel gas does not leak to the atmosphere.

By adopting the diaphragm seal 19, the sliding friction generated when the valve body 14 moves can be eliminated. In addition, by adopting the low-pressure sealing member 21 which is low in the frictional resistance, the sliding friction can be reduced as much as possible. The valve body 14 can be caused to move smoothly by reducing the sliding friction acting on the valve body 14 as above. With this, the secondary pressure can be quickly regulated to the target pressure. Thus, the responsiveness of the secondary pressure is improved.

Further, by adopting the high-pressure sealing member 20, the pressure resistance of the electromagnetic pressure regulating valve 1 with respect to the primary pressure $p_1$ is improved, and the limit pressure of the primary pressure supplied through the primary port 12a can be improved.

In the fuel gas supply system 2, the electromagnetic shutoff valve 7 is provided upstream of the electromagnetic pressure regulating valve 1. With this, these two valves 1 and 7 each having the shutoff function can shut off communication between the high-pressure tank 3 and the fuel gas consuming device. On this account, the safety of the fuel gas supply system 2 is improved. In addition, by providing the electromagnetic pressure regulating valve 1 at the opening portion of the high-pressure tank 3, the pressure level output from the high-pressure tank 3 becomes low, and the safety of the fuel gas supply system 2 is improved significantly.

Embodiment 2

The electromagnetic pressure regulating valve 1A according to Embodiment 2 of the present invention is similar in configuration to the electromagnetic pressure regulating valve 1 according to Embodiment 1. Herein, only components of the configuration of the electromagnetic pressure regulating valve 1A according to Embodiment 2 different from components of the electromagnetic pressure regulating valve 1 according to Embodiment 1 will be explained. The same reference signs are used for the same components, and explanations thereof are omitted. The same is true for Embodiment 3 and subsequent embodiments.

Figure 3:
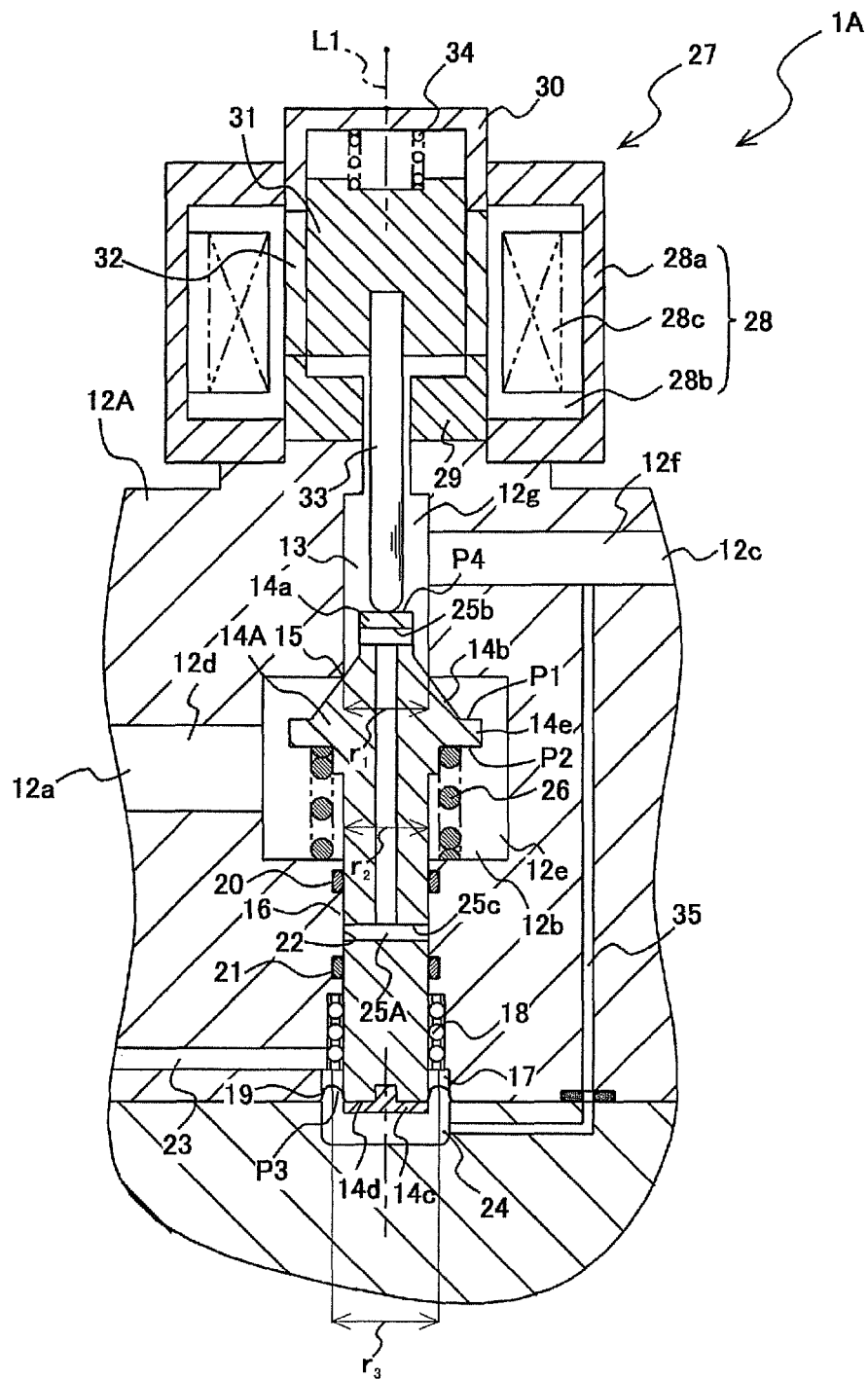
FIG. 3 is a cross-sectional view showing the configuration of an electromagnetic pressure regulating valve of Embodiment 2.

As shown in FIG. 3, the electromagnetic pressure regulating valve 1A according to Embodiment 2 of the present invention includes a pressure return passage 35 in a housing 12A. The pressure return passage 35 is formed to connect the secondary passage 12f of the valve passage 13 and the pressure return chamber 24 and introduces the secondary pressure $p_2$ to the pressure return chamber 24. In a valve body 14A, an opening of a lower side (that is, the pressure return chamber side) of the return chamber communication portion 25a of a pressure equalizing passage 25A is closed, so that the buffer chamber 22 is connected only to the secondary region 12g.

The electromagnetic pressure regulating valve 1A according to Embodiment 2 configured as above has the same operational advantages as the electromagnetic pressure regulating valve 1 according to Embodiment 1.

Embodiment 3

Figure 4:
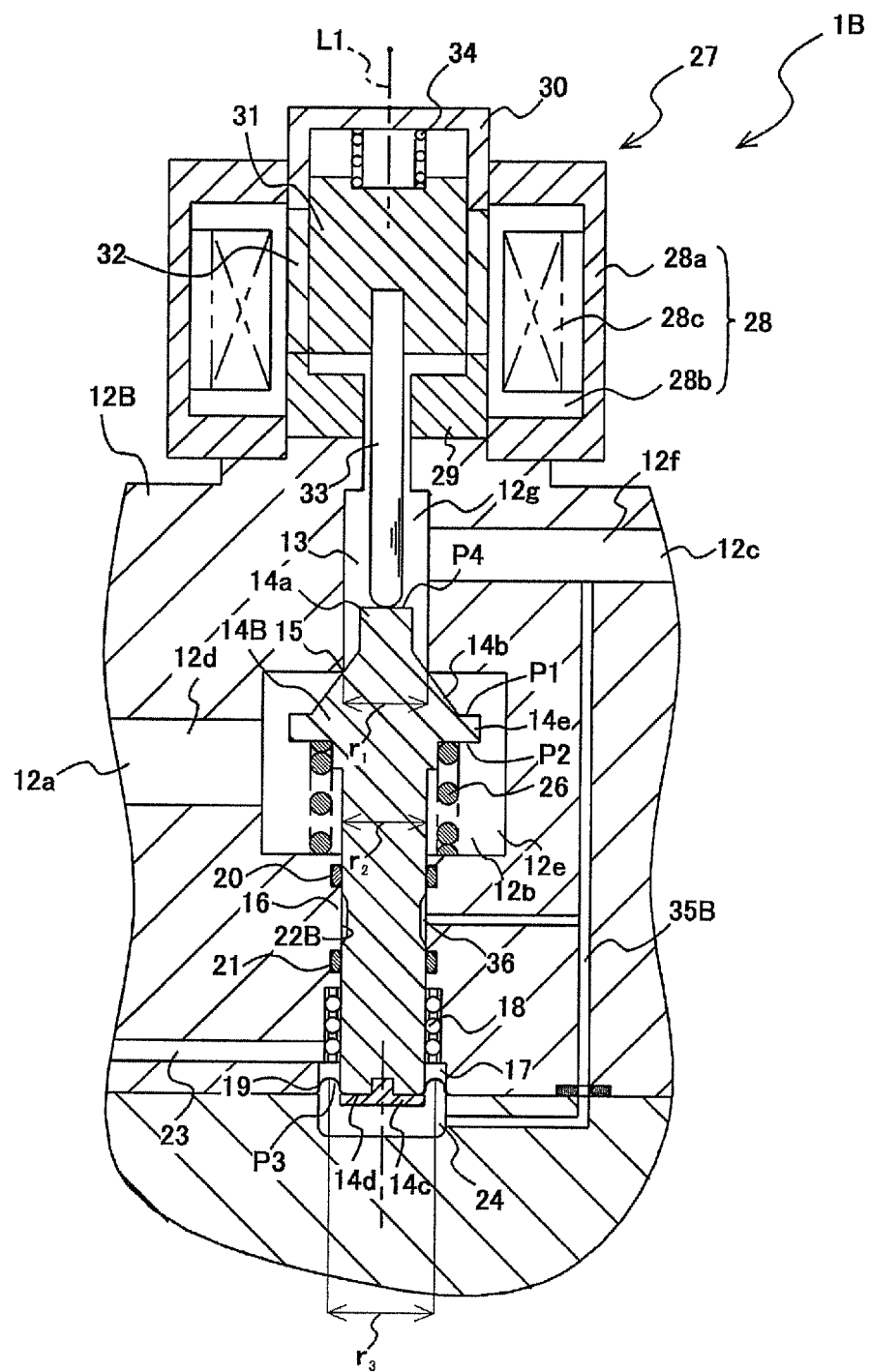
FIG. 4 is a cross-sectional view showing the configuration of an electromagnetic pressure regulating valve of Embodiment 3.

As shown in FIG. 4, the electromagnetic pressure regulating valve 1B according to Embodiment 3 of the present invention includes a valve body 14B. A circumferential groove 36 which is concave in a radially inward direction is formed on the valve body 14B so as to be located between the high-pressure sealing member 20 and the low-pressure sealing member 21. The circumferential groove 36 is formed on an outer periphery of the valve body 14B along the entire periphery. A buffer chamber 22B is formed by the circumferential groove 36 and an inner peripheral surface of the housing 12B so as to be located between the high-pressure sealing member 20 and the low-pressure sealing member 21.

A pressure return passage 35B is formed in the housing 12B. The pressure return passage 35B connects the secondary passage 12f and the pressure return chamber 24 and also connects the secondary passage 12f and the buffer chamber 22B. With this, the secondary pressure $p_2$ can be introduced through the pressure return passage 35B to the pressure return chamber 24, and the fuel gas having leaked to the buffer chamber 22 can be returned to the secondary side.

The electromagnetic pressure regulating valve 1B according to Embodiment 3 configured as above has the same operational advantages as the electromagnetic pressure regulating valve 1 according to Embodiment 1.

Embodiments 4 to 6

The electromagnetic pressure regulating valves 1C to 1E according to Embodiments 4 to 6 of the present invention are respectively similar to the electromagnetic pressure regulating valves 1, 1A, and 1B according to Embodiments 1 to 3. However, regarding the same point, the electromagnetic pressure regulating valves 1C to 1E according to Embodiments 4 to 6 are respectively different from the electromagnetic pressure regulating valves 1, 1A, and 1B according to Embodiments 1 to 3. Hereinafter, only the difference therebetween will be explained, and explanations of the same components therebetween are omitted.

Figure 5:
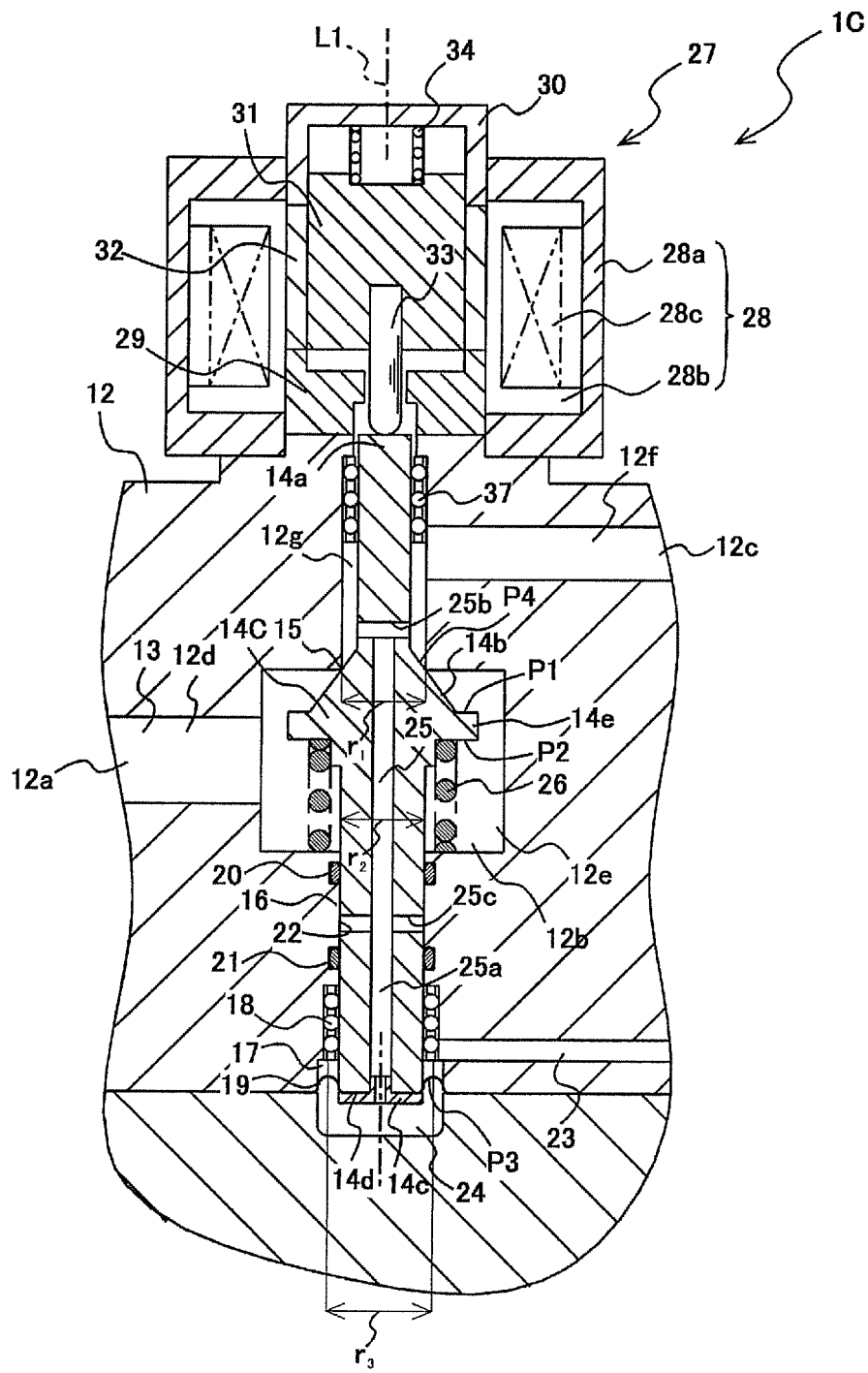
FIG. 5 is a cross-sectional view showing the configuration of an electromagnetic pressure regulating valve of Embodiment 4.
Figure 6:
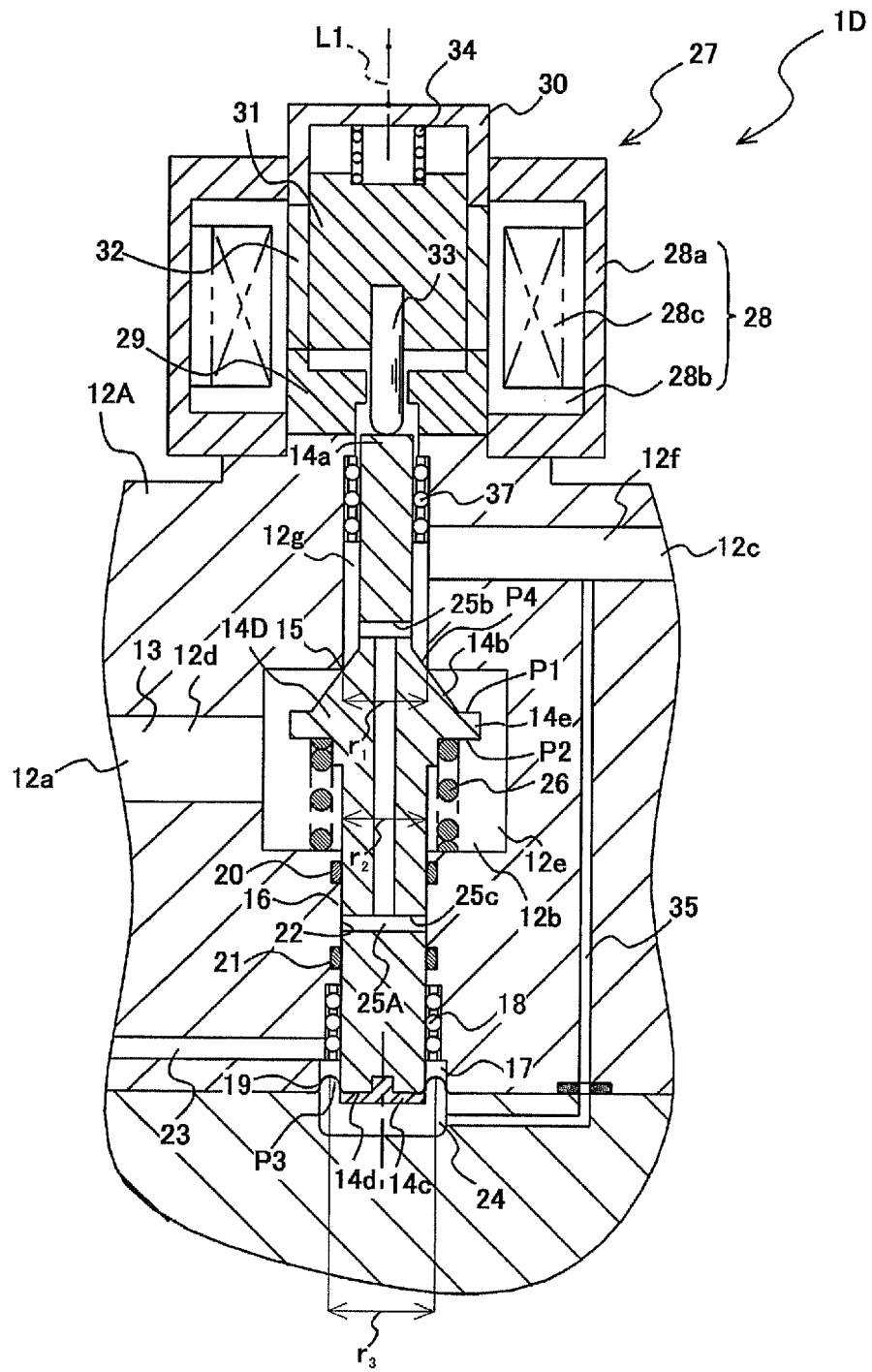
FIG. 6 is a cross-sectional view showing the configuration of an electromagnetic pressure regulating valve of Embodiment 5.
Figure 7:
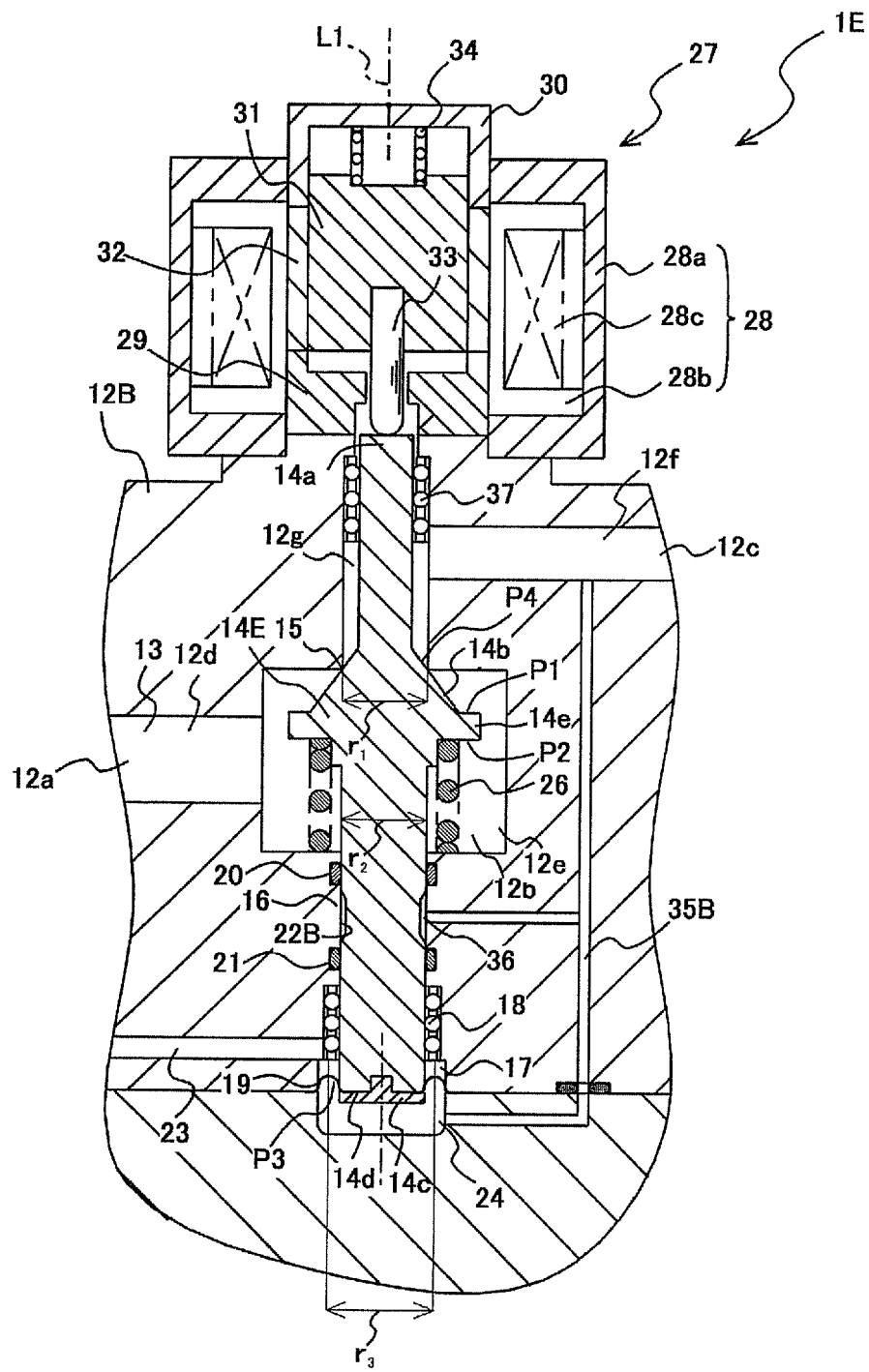
FIG. 7 is a cross-sectional view showing the configuration of an electromagnetic pressure regulating valve of Embodiment 6.

As shown in FIGS. 5 to 7, the electromagnetic pressure regulating valves 1C to 1E according to Embodiments 4 to 6 respectively include valve bodies 14C to 14E. In each of the valve bodies 14C to 14E, the tip end portion 14a extends up to the vicinity of the opening of the housing 12, 12A, or 12B. A bearing member 37 is externally attached to the tip end portion 14a of each of the valve bodies 14C to 14E. The bearing member 37 has a substantially cylindrical shape and is constituted by a ball guide, a ball bearing, a slide bearing, or the like. The bearing member 37 is interposed between the tip end portion 14a and the housing 12 so as to support each of the valve bodies 14C to 14E. With this, each of the valve bodies 14C to 14E can move smoothly in the upper-lower direction.

In each of the electromagnetic pressure regulating valves 1C to 1E according to Embodiments 4 to 6 configured as above, both upper and lower end portions of each of the valve bodies 14C to 14E are respectively supported by the bearing members 18 and 37. Therefore, the valve bodies 14C to 14E can be moved accurately, so that the pressure controllability can be further improved.

The electromagnetic pressure regulating valves 1C to 1E according to Embodiments 4 to 6 respectively have the same operational advantages as the electromagnetic pressure regulating valves 1, 1A, and 1B according to Embodiments 1 to 3.

Embodiment 7

Figure 8:
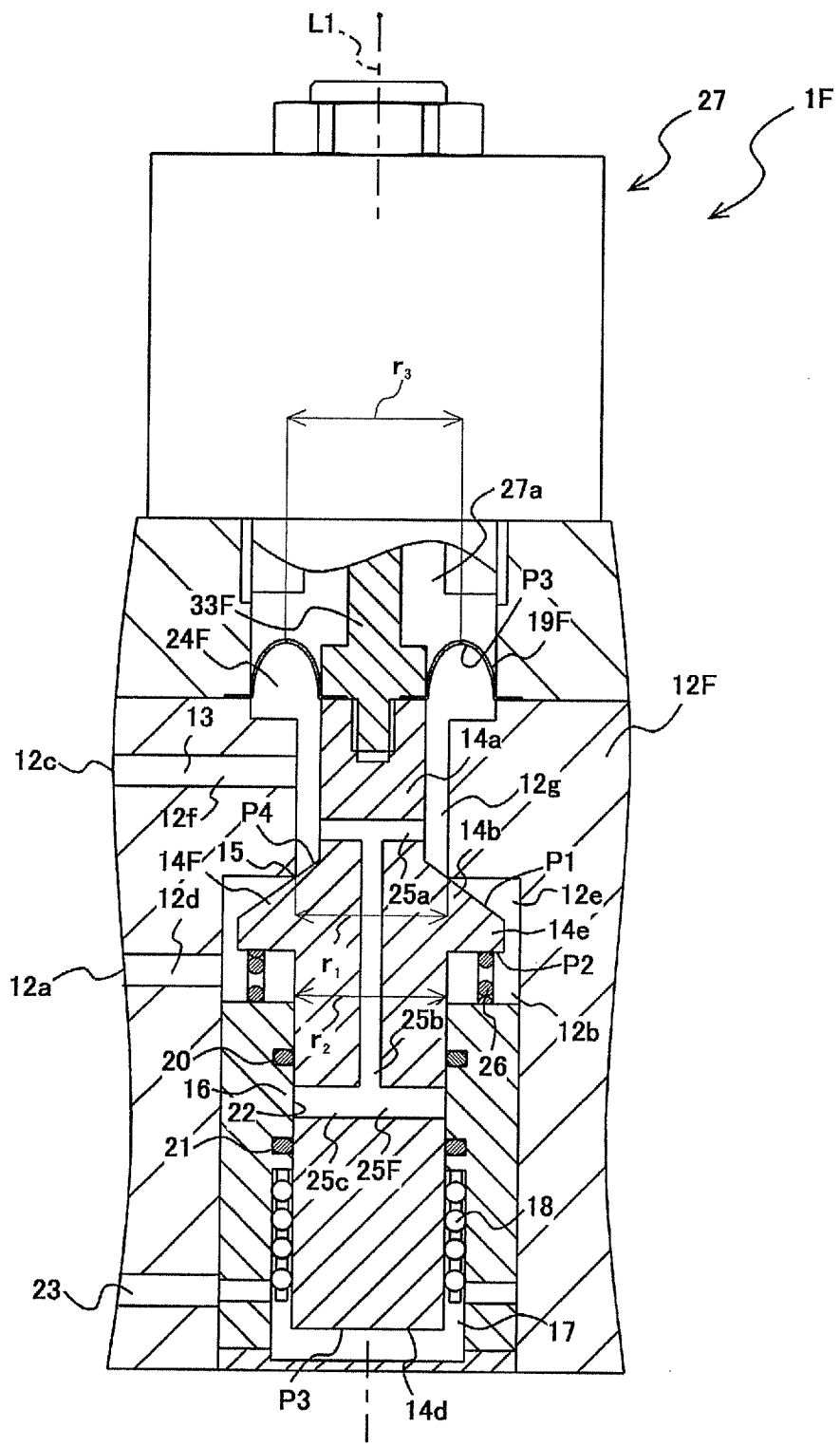
FIG. 8 is a cross-sectional view showing the configuration of an electromagnetic pressure regulating valve of Embodiment 7.

As shown in FIG. 8, in the electromagnetic pressure regulating valve 1F according to Embodiment 7, the tip end portion 14a of a valve body 14F extends up to the vicinity of the opening of the housing 12, and a tip end portion of a pushing member 33F is joined to the tip end portion 14a so as to be threadedly engaged with the tip end portion 14a. A diaphragm seal 19F is provided in the vicinity of an opening of a housing 12F. An outer edge portion of the diaphragm seal 19F is attached to the housing 12F, and an inner edge portion thereof is attached to the valve body 14F. More specifically, the outer edge portion of the diaphragm seal 19F is sandwiched between two parts that are upper and lower separable portions of the housing 12F, and the inner edge portion thereof is sandwiched between the pushing member 33F and the valve body 14. The vicinity of the opening, where the diaphragm seal 19F is provided, of the housing 12F has an inner diameter larger than the inner diameter of the secondary region 12g, and a pressure return chamber 24F is formed in the vicinity of the opening of the housing 12F. The pressure return chamber 24F is located between the secondary region 12g and an inner space 27a of the electromagnetic proportional solenoid 27. The diaphragm seal 19F is located between the pressure return chamber 24F and the inner space 27a (a space in the electromagnetic proportional solenoid 27) and seals therebetween. Since the pressure return chamber 24F is located on the electromagnetic proportional solenoid 27 side, the pressure equalizing passage 25F is configured to connect the secondary region 12g and the buffer chamber 22.

As with the electromagnetic pressure regulating valves 1 and 1A to 1E according to the above embodiments, in the electromagnetic pressure regulating valve 1F according to Embodiment 7 configured as above, the diaphragm seal 19F receives the secondary pressure $p_2$ in the direction toward the closed position. An effective pressure receiving area of the diaphragm seal 19F is larger than the pressure receiving area of the pressure receiving surface P4 of the valve body 14F. Therefore, the opening degree of the valve passage 13 can be adjusted in accordance with the secondary pressure $p_2$, and the secondary pressure $p_2$ can be regulated to the target pressure.

In the electromagnetic pressure regulating valve 1F according to Embodiment 7, since the diaphragm seal 19F seals between the pressure return chamber 24F and the inner space 27a of the electromagnetic proportional solenoid 27, the fuel gas does not flow out from the housing 12 to the inner space 27a of the electromagnetic proportional solenoid 27. Therefore, the fuel gas is not discharged through the inner space 27a of the electromagnetic proportional solenoid 27 to the atmosphere, so that the electromagnetic proportional solenoid 27 can be provided in the atmosphere. On this account, in a case where a corrosive fluid, such as a hydrogen gas, is used as the fuel gas, respective components of the electromagnetic proportional solenoid 27 can be prevented from being exposed to the corrosive fluid. Thus, the respective components can be prevented from corroding.

The electromagnetic pressure regulating valve 1F according to Embodiment 7 has the same operational advantages as the electromagnetic pressure regulating valve 1 according to Embodiment 7.

Embodiment 8

Figure 9:
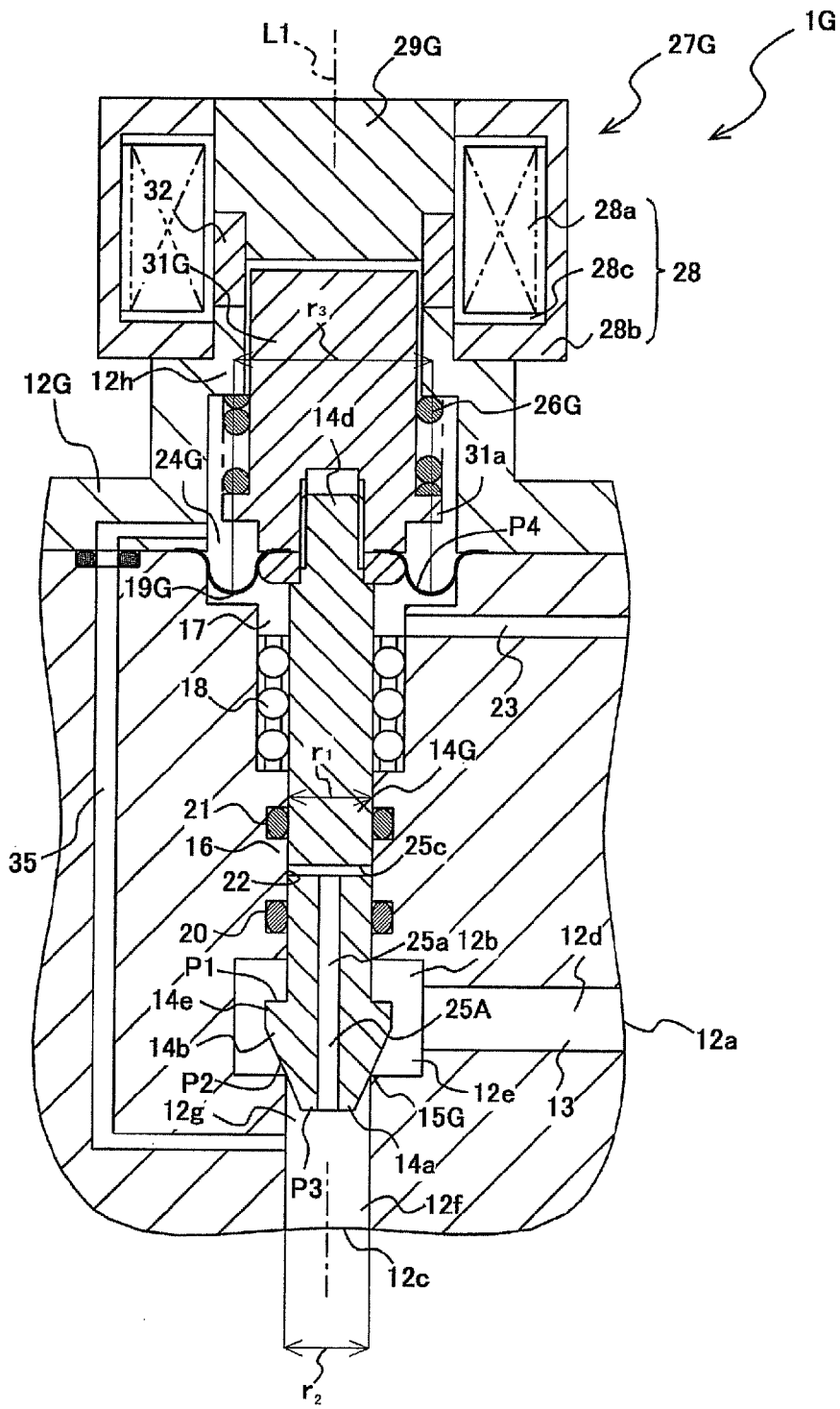
FIG. 9 is a cross-sectional view showing the configuration of an electromagnetic pressure regulating valve of Embodiment 8.

As shown in FIG. 9, in the electromagnetic pressure regulating valve 1G according to Embodiment 8, the valve body hole 12b is formed in a housing 12G along the axis line L1, and the secondary region 12g is located on a lower side of the valve space 12e. The housing 12G includes a seat portion 15G in the vicinity of an opening of the secondary region 12g, the opening being located on the valve space 12e side. The seat portion 15G is formed so as to surround the opening. Further, a valve body 14G is inserted in the valve body hole 12b of the housing 12G along the axis line L1. The valve body 14G includes the tapered portion 14b configured to taper downwardly toward a lower end side of the valve body 14G and is seated on the seat portion 15G such that a tip end portion of the tapered portion 14b is inserted in the secondary region 12g.

The housing 12G includes the bearing member accommodating space 17 located above the valve space 12e, and further includes the seal attaching portion 16 located between the bearing member accommodating space 17 and the valve space 12e. As with Embodiment 1, at the seal attaching portion 16, the high-pressure sealing member 20 is provided on the valve space 12e side, and the low-pressure sealing member 21 is provided on the bearing member accommodating space 17 side. The buffer chamber 22 is formed between the high-pressure sealing member 20 and the low-pressure sealing member 21. The bearing member 18 having a substantially cylindrical shape is accommodated in the bearing member accommodating space 17 so as to be externally attached to the valve body 14G. The bearing member 18 is interposed between the housing 12G and the valve body 14G to support the valve body 14G. With this, the valve body 14G can move smoothly in the upper-lower direction.

An electromagnetic proportional solenoid 27G is threadedly engaged with and fixed to an outer periphery of an opening end portion of the housing 12G. The electromagnetic proportional solenoid 27G includes the solenoid coil 28 and a fixed magnetic pole 29G. The fixed magnetic pole 29G is provided at an upper opening portion of the solenoid coil 28 so as to close the upper opening portion. A movable member 31G is provided in the solenoid coil 28. The movable member 31G is a substantially columnar member made of a magnetic material. An upper end of the movable member 31G is opposed to the fixed magnetic pole 29G, and a lower end side thereof is inserted in the valve body hole 12b of the housing 12G. The guide member 32 having an annular shape and made of a non-magnetic material is interposed between the movable member 31G and the solenoid coil 28. The lower end of the movable member 31G extends up to an upper end portion of the valve body 14G, and the upper end portion of the valve body 14G is threadedly engaged with and fixed to the lower end of the movable member 31G.

In the valve body hole 12b of the housing 120 the diameter of a portion between the opening end portion and the bearing member accommodating space 17 is large as with the valve space 12e, and the diaphragm seal 19G is provided in the portion. The diaphragm seal 19G is located above the bearing member accommodating space 17. An outer edge portion of the diaphragm seal 19G is attached to the housing 12G, and an inner edge portion thereof is attached to the valve body 14G. More specifically, the outer edge portion of the diaphragm seal 19G is sandwiched between two parts that are upper and lower separable portions of the housing 120 and the inner edge portion thereof is sandwiched between the movable member 31G and the valve body 14G.

With this, in the valve body hole 12b of the housing 12G, a region on the upper side of the diaphragm seal 19G becomes a pressure return chamber 24G. A pressure return passage 35G is formed in the housing 12G and connects the pressure return chamber 24G and the secondary region 12g. With this, the secondary pressure $p_2$ is introduced to the pressure return chamber 24G.

The movable member 31G includes a flange 31a located on an outer peripheral surface of a lower end side thereof. The flange 31a projects in a radially outward direction and is formed along the entire periphery in the circumferential direction. The housing 12G includes a receiving portion 12h located so as to be opposed to an upper surface of the flange 31a. A return spring 26G is provided between the receiving portion 12h and the flange 31a. The return spring 26G is a so-called compression coil spring, is externally attached to the movable member 31G in a compressed state, and biases the valve body 14G in the direction toward the closed position via the movable member 31G. When the current is supplied to the electromagnetic proportional solenoid 27, the magnetizing force in a direction against the spring force of the return spring 26G (that is, in the direction toward the open position) acts on the movable member 31.

In the electromagnetic pressure regulating valve 1G according to Embodiment 8, an outer diameter of a portion, located on the upper side of the tapered portion 14b, of the valve body 14G (except for a portion which is threadedly engaged with the movable member 31G) is substantially the same as the seat diameter. Therefore, the pressure receiving area of the pressure receiving surface P1 (the upper surface of the flange 14e) and the pressure receiving area of the pressure receiving surface P2 (a tapered surface of the tapered portion 14b) are substantially equal to each other. On this account, the acting force generated by the primary pressure $p_1$ received by the pressure receiving surface P1 of the valve body 14G and the acting force generated by the primary pressure $p_1$ received by the pressure receiving surface P2 of the valve body 14G cancel each other, so that influences due to the change in the primary pressure $p_1$ on the valve body 14 can be prevented.

The pressure receiving area of the pressure receiving surface P3 is larger than the pressure receiving area of the pressure receiving surface P4 by the effective pressure receiving area of the diaphragm seal 19G. The pressure receiving surface P3 receives the acting force generated by the secondary pressure $p_2$ in the direction toward the opened position, and the pressure receiving surface P4 receives the acting force generated by the secondary pressure $p_2$ in the opposite direction, that is, in the direction toward the closed position, so that these acting forces cancel each other. However, the acting force corresponding to the difference between the pressure receiving areas of the pressure receiving surfaces P3 and P4 acts on the valve body 14G. As above, the acting force generated by the secondary pressure $p_2$ acts on the valve body 14G in the direction toward the closed position, and the valve body 14 is biased by the return spring 26G in the direction toward the closed position. Therefore, the electromagnetic pressure regulating valve 1G is configured as a normally closed valve.

The electromagnetic pressure regulating valve 1G according to Embodiment 8 configured as above can regulate the secondary pressure $p_2$ to the target pressure by the same operations as the electromagnetic pressure regulating valve 1 of Embodiment 1 except that when the current is supplied to the solenoid coil 28, the valve body 14G is pulled upward in order to cause the valve body 14G to move in the direction toward the closed position (to be specific, the electromagnetic pressure regulating valve 1G is a pull-type electromagnetic pressure regulating valve). In addition, the electromagnetic pressure regulating valve 1G according to Embodiment 8 has the same operational advantages as the electromagnetic pressure regulating valve 1 according to Embodiment 1.

Embodiment 9

The electromagnetic pressure regulating valve 1H according to Embodiment 9 of the present invention is similar in configuration to the electromagnetic pressure regulating valve 1G according to Embodiment 8. Herein, only components of the configuration of the electromagnetic pressure regulating valve 1G according to Embodiment 9 different from components of the electromagnetic pressure regulating valve 1 according to Embodiment 1 will be explained. The same reference signs are used for the same components, and explanations thereof are omitted. The same is true for Embodiment 10.

Figure 10:
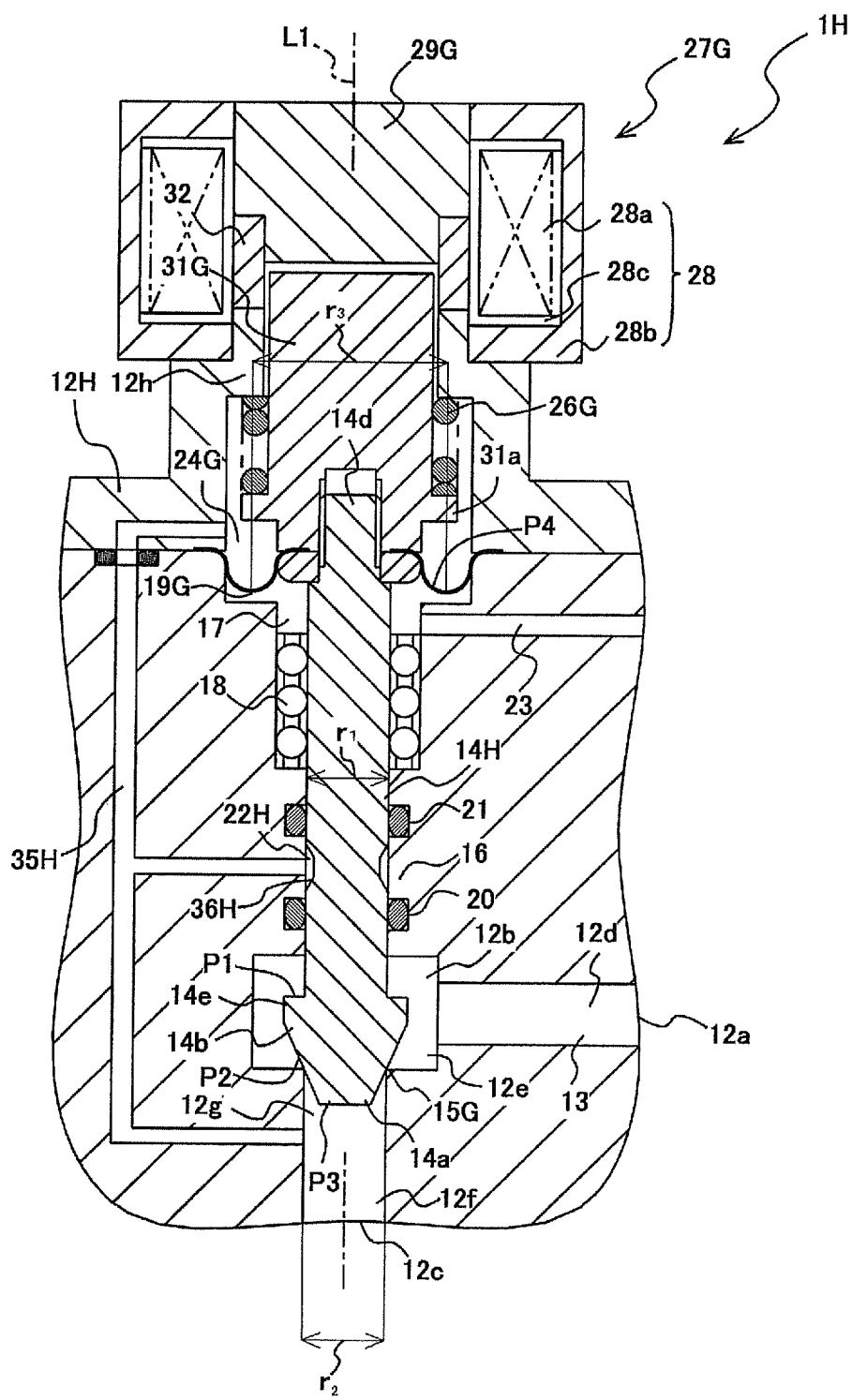
FIG. 10 is a cross-sectional view showing the configuration of an electromagnetic pressure regulating valve of Embodiment 9.

As shown in FIG. 10, the electromagnetic pressure regulating valve 1H according to Embodiment 9 includes a valve body 1414. A circumferential groove 36H which is concave in a radially inward direction is formed on the valve body 14H so as to be located between the high-pressure sealing member 20 and the low-pressure sealing member 21. The circumferential groove 36H is formed on an outer periphery of the valve body 14H along the entire periphery. A buffer chamber 22H is formed by the outer periphery of the valve body 14H and an inner peripheral surface of the housing 12H so as to be located between the high-pressure sealing member 20 and the low-pressure sealing member 21. The buffer chamber 22H is connected to the pressure return passage 35H, and the fuel gas having leaked to the buffer chamber 22 is returned through the pressure return passage 35H to the secondary side, such as the pressure return chamber 24G and the secondary region 12g.

The electromagnetic pressure regulating valve 1H according to Embodiment 9 configured as above has the same operational advantages as the electromagnetic pressure regulating valve 1G according to Embodiment 8.

Embodiment 10

Figure 11:
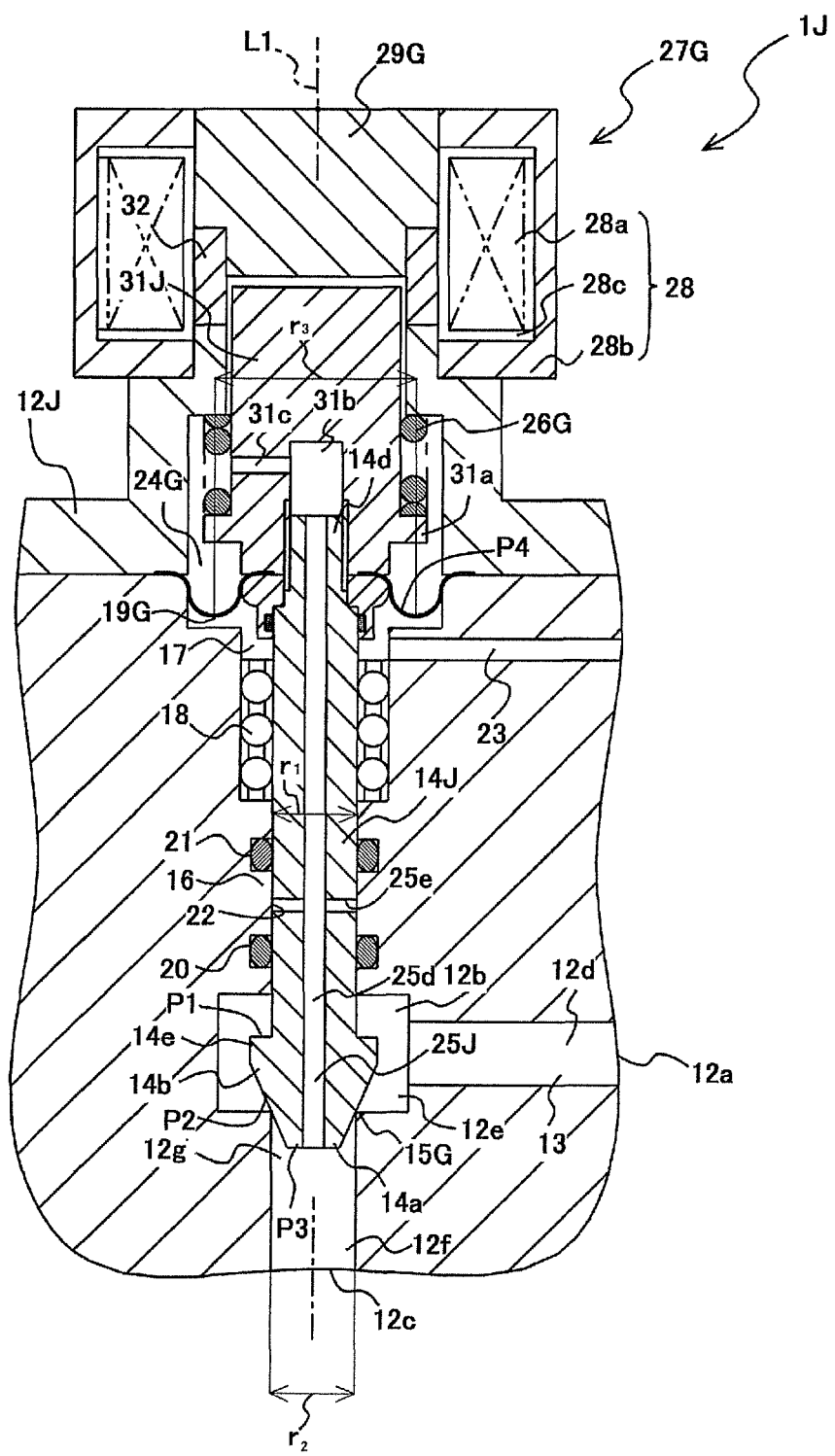
FIG. 11 is a cross-sectional view showing the configuration of an electromagnetic pressure regulating valve of Embodiment 10.
Figure 12:
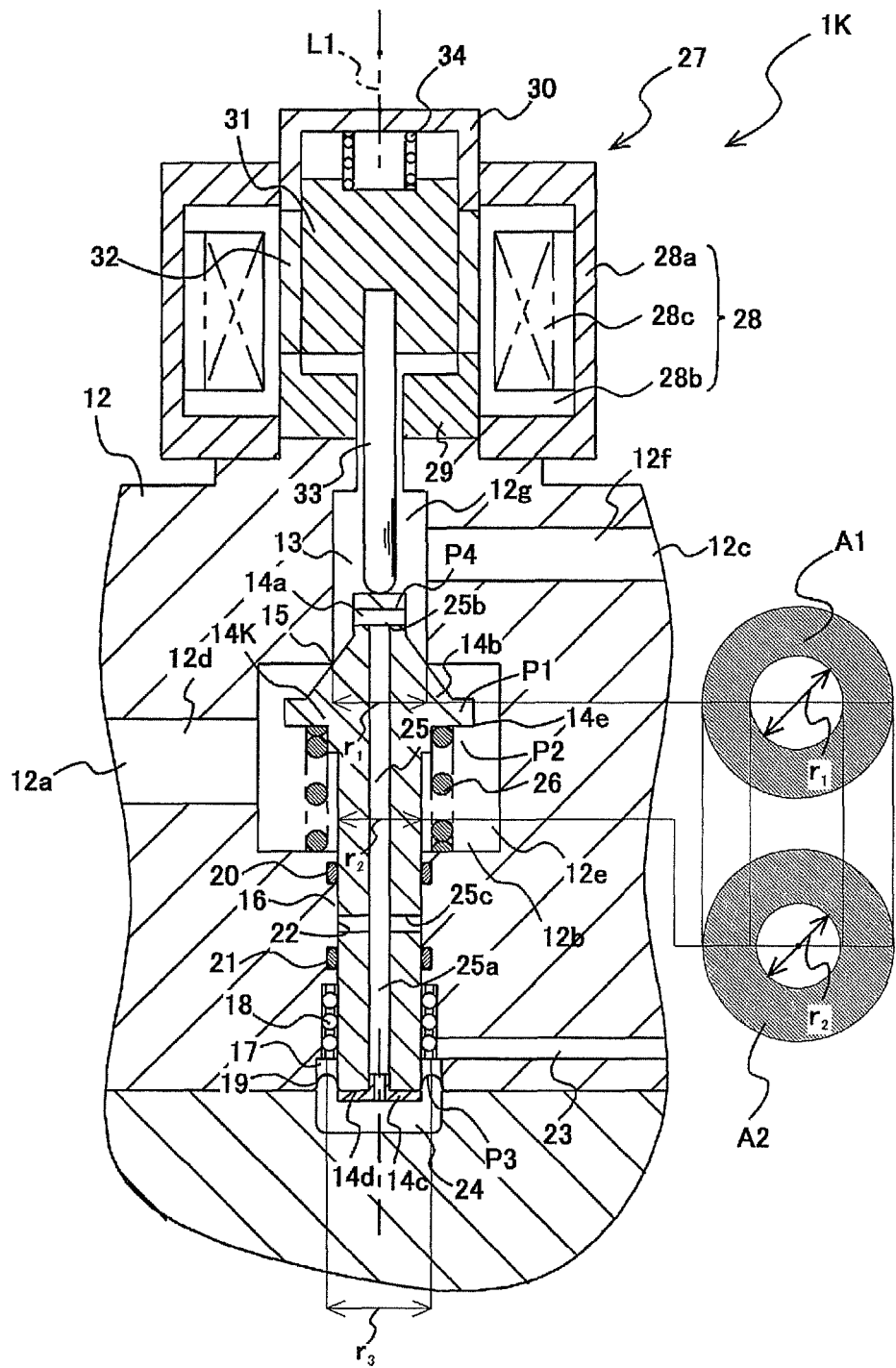
FIG. 12 is a cross-sectional view showing the configuration of an electromagnetic pressure regulating valve of Embodiment 11.
Figure 13:
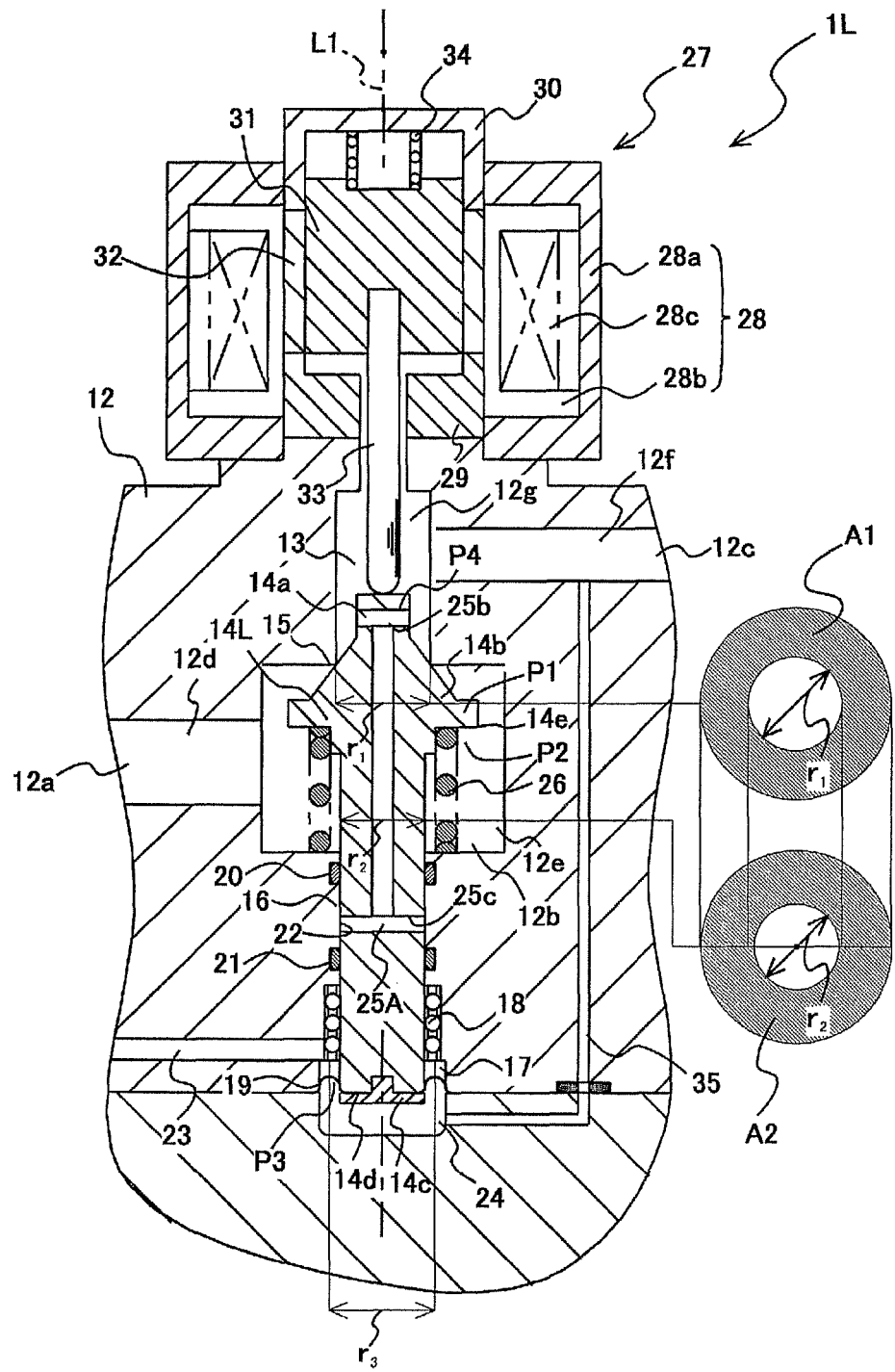
FIG. 13 is a cross-sectional view showing the configuration of an electromagnetic pressure regulating valve of Embodiment 12.
Figure 14:
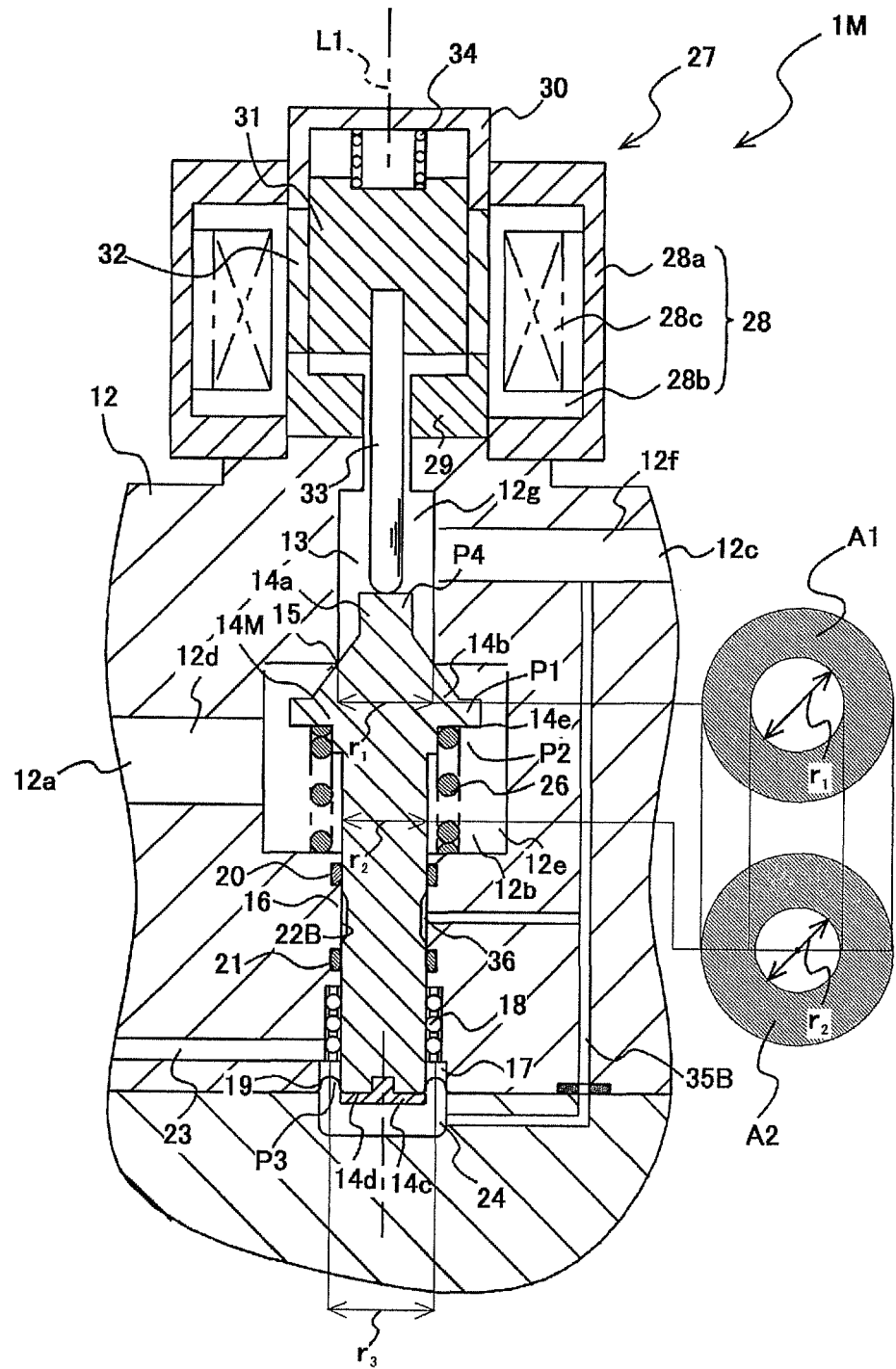
FIG. 14 is a cross-sectional view showing the configuration of an electromagnetic pressure regulating valve of Embodiment 13.
Figure 15:
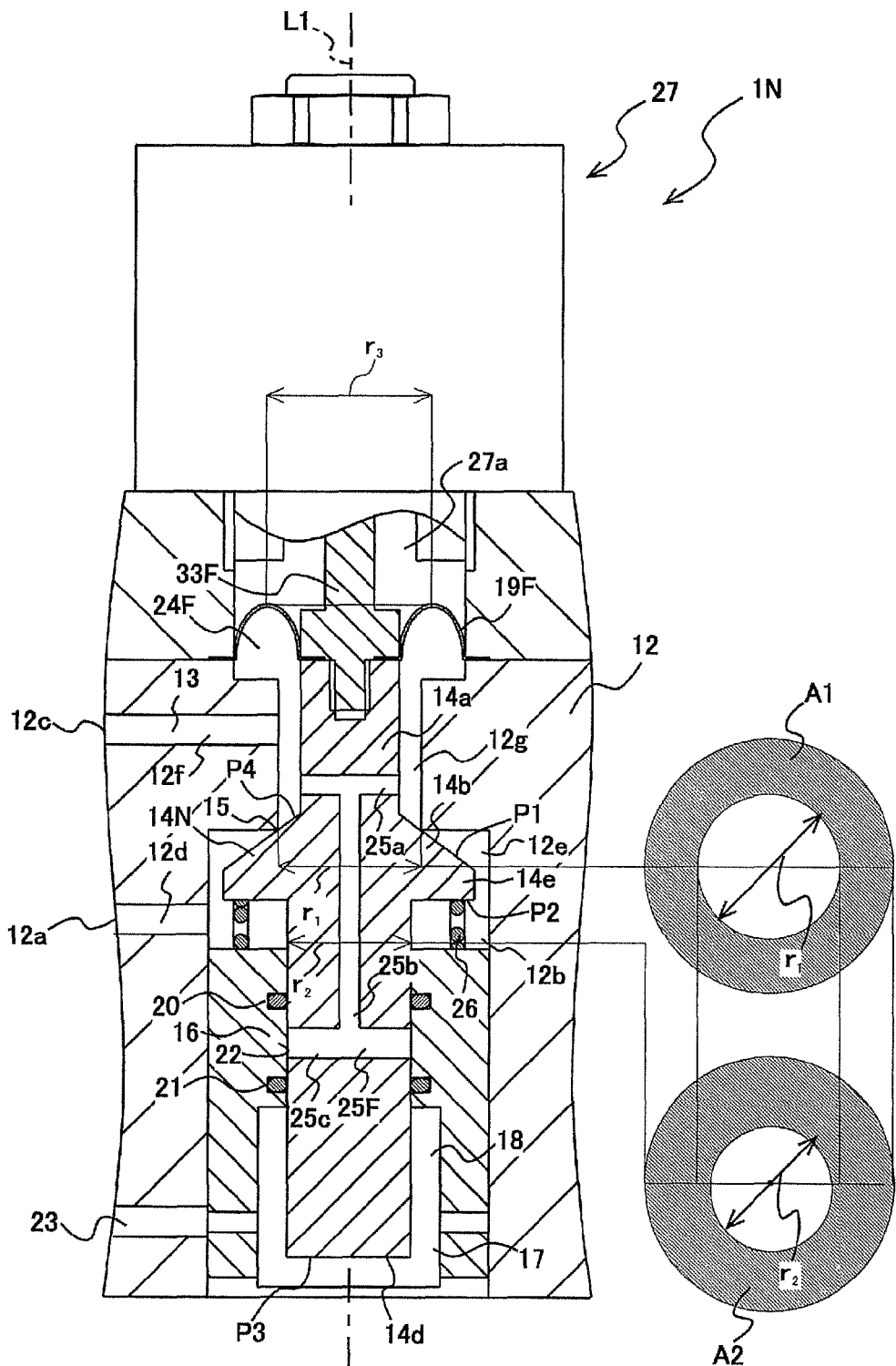
FIG. 15 is a cross-sectional view showing the configuration of an electromagnetic pressure regulating valve of Embodiment 14.

As shown in FIG. 11, in the electromagnetic pressure regulating valve 1J according to Embodiment 10, a pressure equalizing passage 25J is formed in a valve body 14J. The pressure equalizing passage 25J includes a communication portion 25d and a return portion 25e. The communication portion 25d penetrates the valve body 14J along the axis line L1 from the lower end up to the upper end. The return portion 25e extends in the radial direction and connects the buffer chamber 22 and the communication portion 25d. A communication chamber 31b is formed in the movable member 31J. The communication chamber 31b communicates with the pressure equalizing passage 25J and is connected to the pressure return chamber 24G through a communicating passage 31c formed in the movable member 31J.

In the electromagnetic pressure regulating valve 1J according to Embodiment 10 configured as above, the secondary pressure $p_2$ of the secondary region 12g is introduced through the pressure equalizing passage 25J, the communication chamber 31b, and the communicating passage 31c to the pressure return chamber 24G. In addition, the fuel gas having leaked to the buffer chamber 22G is returned through the pressure equalizing passage 25J and the like to the secondary side, such as the pressure return chamber 24G and the secondary region 12g.

The electromagnetic pressure regulating valve 1J according to Embodiment 10 configured as above has the same operational advantages as the electromagnetic pressure regulating valve 1G according to Embodiment 8.

Embodiments 11 to 14

The electromagnetic pressure regulating valves 1K to 1N according to Embodiments 11 to 14 are respectively similar to the electromagnetic pressure regulating valves 1 and 1A to 1C according to Embodiments 1 to 4. However, as shown in FIGS. 12 to 15, the electromagnetic pressure regulating valves 1K to 1N according to Embodiments 11 to 14 are respectively different from the electromagnetic pressure regulating valves 1 and 1A to 1C according to Embodiments 1 to 4 regarding a pressure receiving area A1 and a pressure receiving area A2. Hereinafter, the pressure receiving areas A1 and A2 will be explained in detail.

In each of the electromagnetic pressure regulating valves 1K to 1N according to Embodiments 11 to 14, the outer diameter $r_2$ of the valve body 14 is smaller than the seat diameter $r_1$. Therefore, the pressure receiving area of the pressure receiving surface P1 is smaller than the pressure receiving area of the pressure receiving surface P2. On this account, the acting force generated by the primary pressure $p_1$ corresponding to the difference between the pressure receiving area of the pressure receiving surface P1 and the pressure receiving area of the pressure receiving surface P2 acts on the valve body 14 toward the closed position. Thus, the speed of each of valve bodies 14K to 14N moving toward the closed position when the supply of the current to the solenoid coil 28 is shut off increases, and the shutoff performance is improved.

Since the acting force generated by the primary pressure $p_1$ acts toward the closed position, sealing surface pressure between a seat portion of the seat portion 15 and each of the valve bodies 14K to 14N increases. Therefore, each of the electromagnetic pressure regulating valves 1D to 1G can firmly close the valve passage 13 to prevent the fuel gas from leaking from the primary side to the secondary side.

Each of the electromagnetic pressure regulating valves 1K to 1N according to Embodiments 11 to 14 has the same operational advantages as the electromagnetic pressure regulating valve 1 according to Embodiment 1.

Embodiment 15

Figure 16:
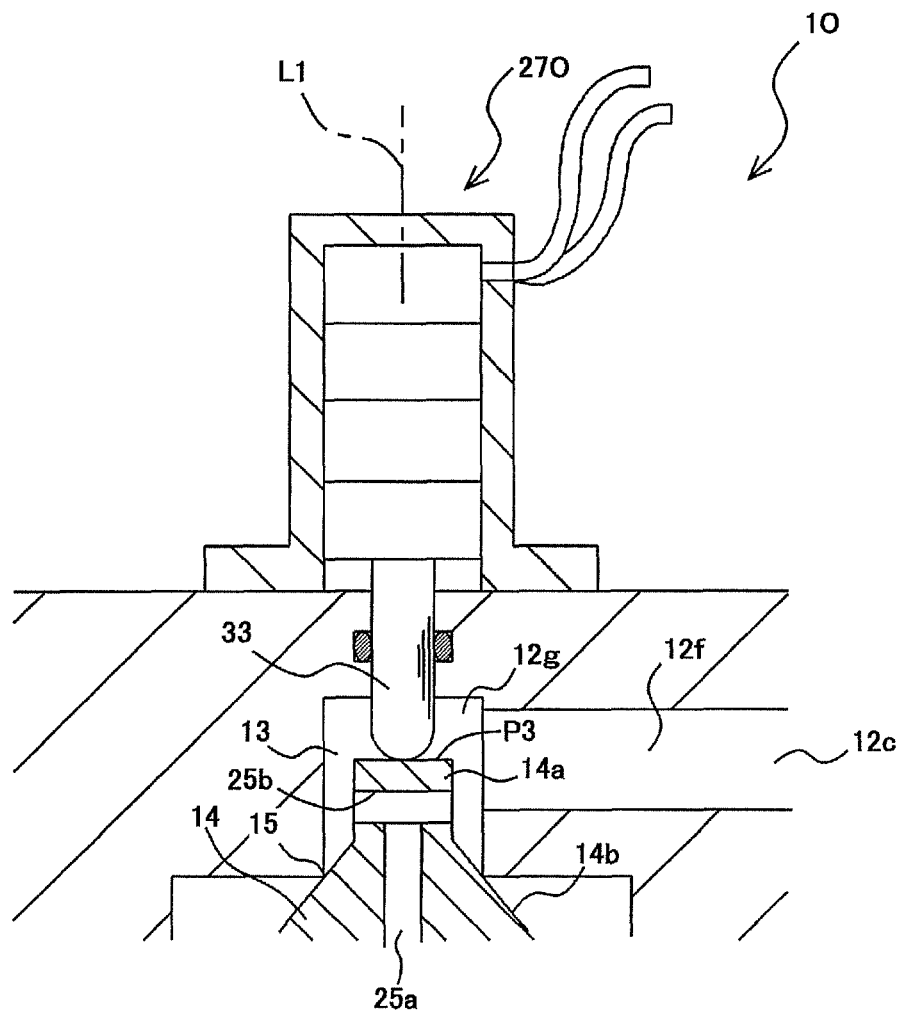
FIG. 16 is a cross-sectional view partially showing the configuration of an electromagnetic pressure regulating valve of Embodiment 15.

A pressure regulating valve 1O according to Embodiment 15 is similar to the electromagnetic pressure regulating valve 1 according to Embodiment 1. However, as shown in FIG. 16, the pressure regulating valve 1O according to Embodiment 15 includes a piezoelectric actuator 27O instead of the electromagnetic proportional solenoid 27. The piezoelectric actuator 27O that is the valve body driving unit is constituted by a piezoelectric element (for example, a piezo element), generates a driving force corresponding to applied voltage, and causes the valve body 14 to move in the direction toward the open position via the pushing member 33 to open the valve passage 13. At this time, the opening degree of the valve passage 13 corresponds to the generated driving force, and the electromagnetic pressure regulating valve 1O can regulate the secondary pressure $p_2$ to pressure corresponding to the applied voltage applied to the piezoelectric actuator 27O.

Other than the above, the pressure regulating valve 1O according to Embodiment 15 is the same in configuration as the electromagnetic pressure regulating valve 1 according to Embodiment 1. Thus, the pressure regulating valve 1O according to Embodiment 15 has the same operational advantages as the electromagnetic pressure regulating valve 1 according to Embodiment 1.

Embodiment 16

Figure 17:
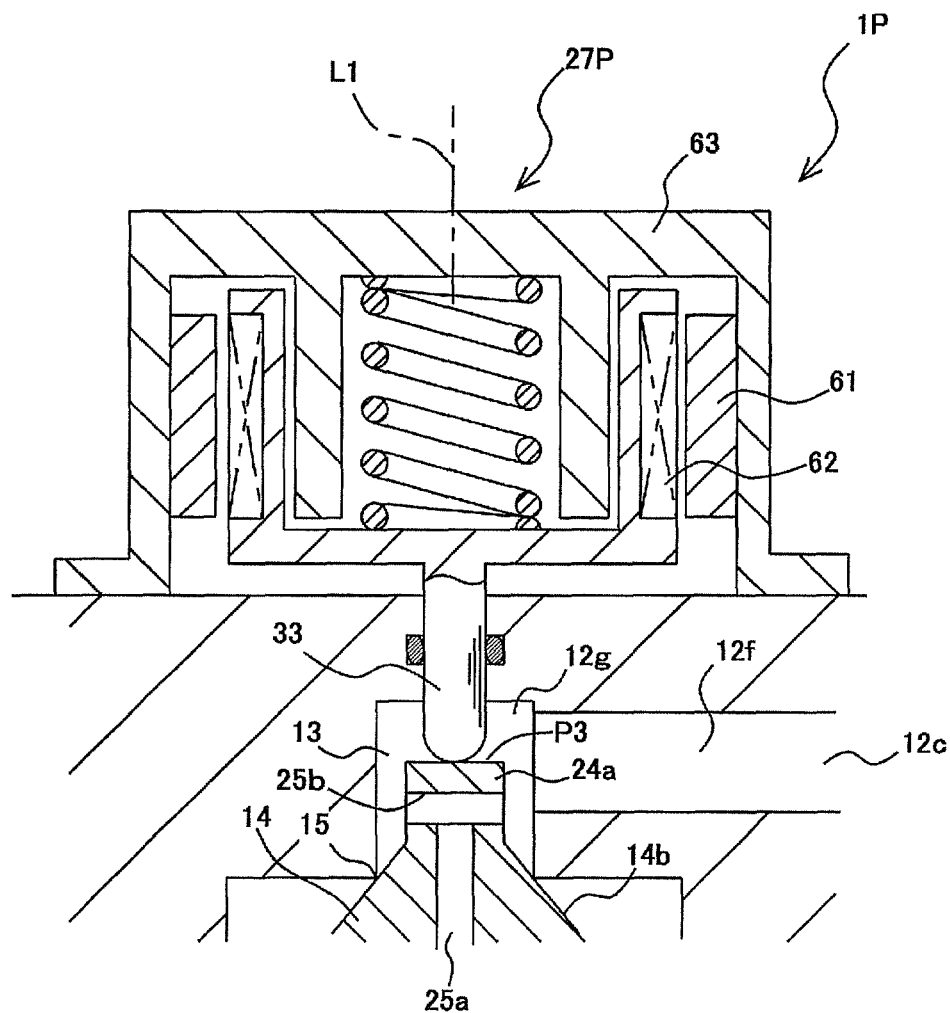
FIG. 17 is a cross-sectional view partially showing the configuration of an electromagnetic pressure regulating valve of Embodiment 16.

A pressure regulating valve 1P according to Embodiment 16 is similar to the electromagnetic pressure regulating valve 1 of Embodiment 1. However, as shown in FIG. 17, the pressure regulating valve 1P according to Embodiment 16 includes a force motor 27P instead of the electromagnetic proportional solenoid 27. The force motor 27P is configured such that a moving coil 62 is inserted in a cylindrical permanent magnet 61. When the current is supplied to the moving coil 62, the magnetizing force corresponding to the supplied current is generated. By this magnetizing force, the moving coil 62 moves in a yoke 63 in the lower direction. When the moving coil 62 moves in the lower direction, the valve body 14 is pushed in the direction toward the open position by the pushing member 33 formed integrally with the moving coil 62. Thus, the valve passage 13 opens. At this time, the opening degree of the valve passage 13 corresponds to the generated magnetizing force, and the pressure regulating valve 1P can regulate the secondary pressure $p_2$ to pressure corresponding to the current supplied to the force motor 27P.

Other than the above, the pressure regulating valve 1P according to Embodiment 16 is the same in configuration as the electromagnetic pressure regulating valve 1 according to Embodiment 1. Thus, the pressure regulating valve 1P according to Embodiment 16 has the same operational advantages as the electromagnetic pressure regulating valve 1 according to Embodiment 1.

Embodiment 17

Figure 18:
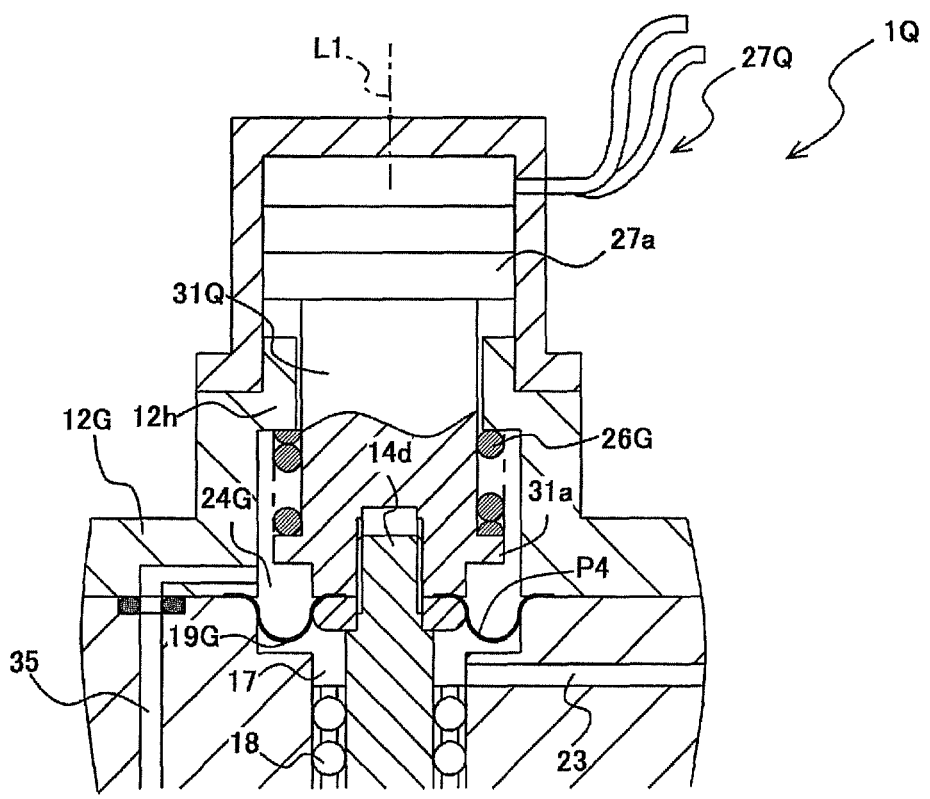
FIG. 18 is a cross-sectional view partially showing the configuration of an electromagnetic pressure regulating valve of Embodiment 17.
Figure 19:
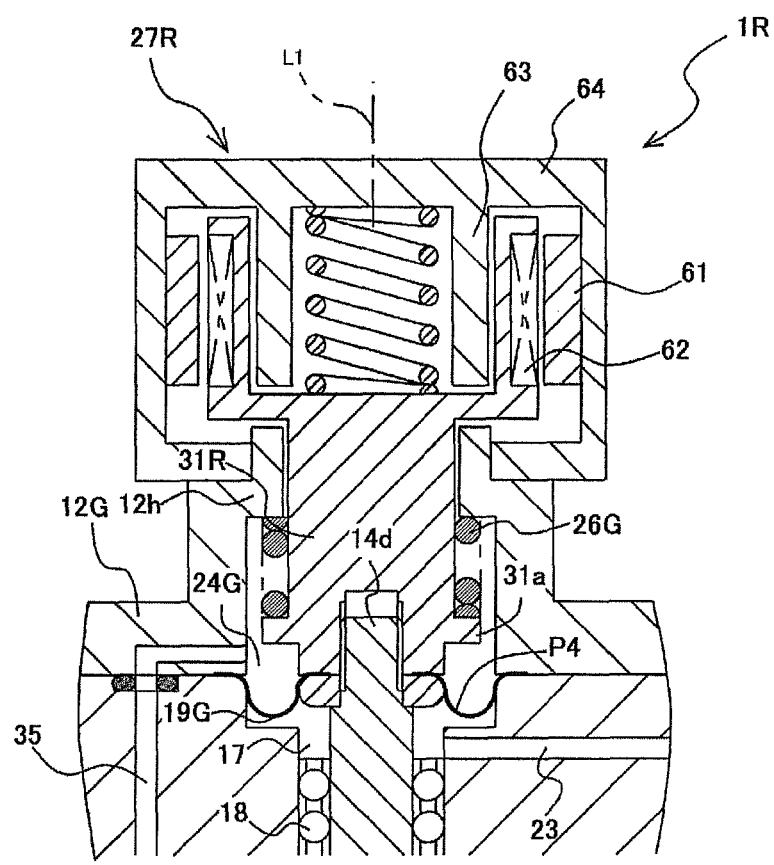
FIG. 19 is a cross-sectional view partially showing the configuration of an electromagnetic pressure regulating valve of Embodiment 18.

A pressure regulating valve 1Q according to Embodiment 17 is similar to the electromagnetic pressure regulating valve 1G according to Embodiment 8. However, as shown in FIG. 18, the pressure regulating valve 1Q according to Embodiment 17 includes a piezoelectric actuator 27Q instead of the electromagnetic proportional solenoid 27G. The piezoelectric actuator 27Q causes the piezoelectric element 27a (for example, a piezo element) to contract by voltage application. With this, the valve body 14 is caused to move in the direction toward the open position (in the upper direction) via a movable member 31Q formed integrally with the piezoelectric element 27a. Thus, the valve body 14 opens the valve passage 13. At this time, the opening degree of the valve passage 13 corresponds to the generated driving force, and the pressure regulating valve 1Q can regulate the secondary pressure $p_2$ to pressure corresponding to the applied voltage applied to the piezoelectric actuator 27Q.

Other than the above, the pressure regulating valve 1Q according to Embodiment 17 is the same in configuration as the electromagnetic pressure regulating valve 1G according to Embodiment 8. Thus, the pressure regulating valve 1Q according to Embodiment 17 has the same operational advantages as the electromagnetic pressure regulating valve 1G according to Embodiment 8.

Embodiment 18

A pressure regulating valve 1R according to Embodiment 18 is similar to the electromagnetic pressure regulating valve 1G according to Embodiment 8. However, as shown in FIG. 18, the pressure regulating valve 1R according to Embodiment 18 includes a force motor 27R instead of the electromagnetic proportional solenoid 27G. A movable member 31R is formed integrally with the moving coil 62 of the force motor 27R. When the current is supplied to the moving coil 62, the moving coil 62 moves, and the valve body 14 moves in the direction toward the open position to open the valve passage 13. At this time, the opening degree of the valve passage 13 corresponds to the generated magnetizing force, and the pressure regulating valve 1R can regulate the secondary pressure $p_2$ to pressure corresponding to the current supplied to the force motor 27R.

Other than the above, the pressure regulating valve 1R according to Embodiment 18 is the same in configuration as the electromagnetic pressure regulating valve 1G according to Embodiment 8. Thus, the pressure regulating valve 1R according to Embodiment 18 has the same operational advantages as the electromagnetic pressure regulating valve 1G according to Embodiment 8.

Embodiment 19

Figure 20:
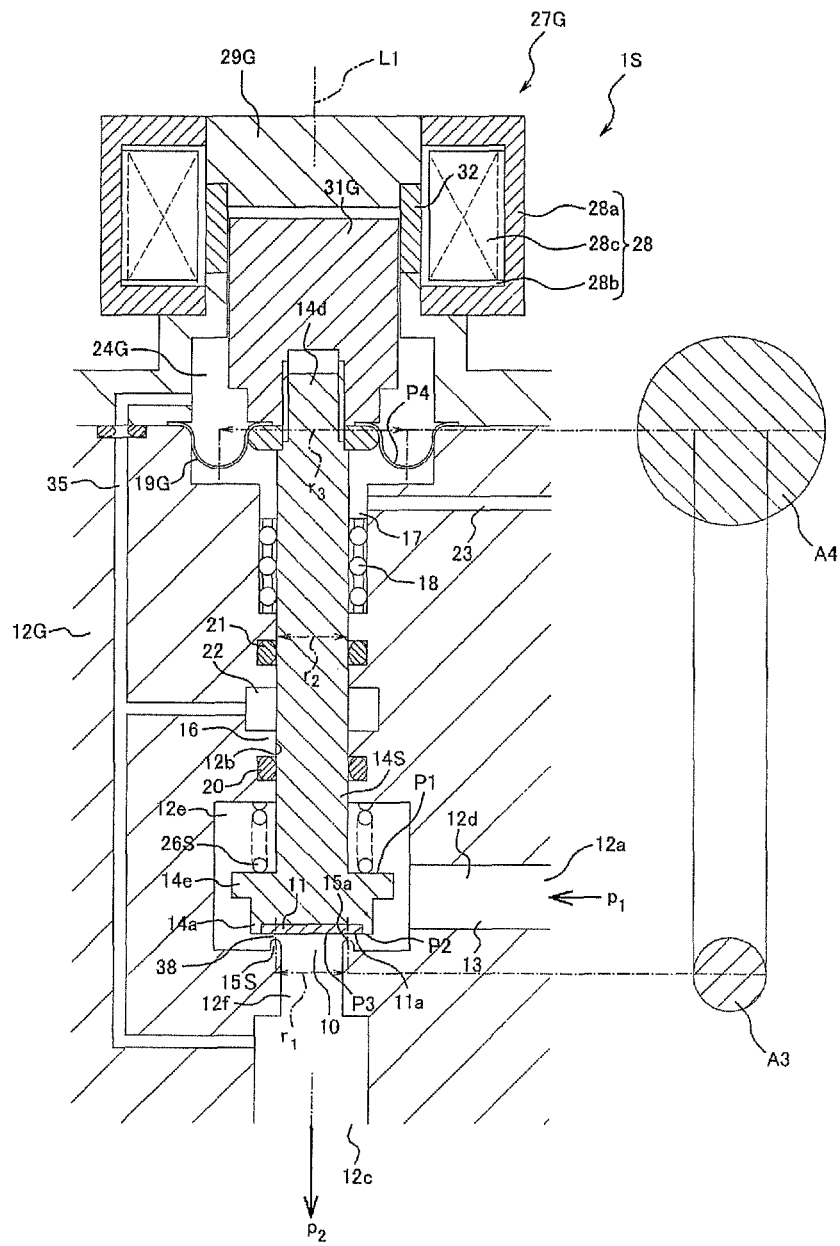
FIG. 20 is a cross-sectional view showing the configuration of an electromagnetic pressure regulating valve of Embodiment 19.

The electromagnetic pressure regulating valve 1S according to Embodiment 19 is similar to the electromagnetic pressure regulating valve 1G according to Embodiment 8. However, as shown in FIG. 20, the electromagnetic pressure regulating valve 1S according to Embodiment 19 is different from the electromagnetic pressure regulating valve 1G according to Embodiment 8 mainly regarding the shape of a valve seat portion 15S, the shape of the tip end portion 14a of a valve body 14S, and the position of a return spring 26S. The valve seat portion 15S is formed along an outer edge of a valve port 10 that is an opening connecting the secondary passage 12f and the valve space 12e so as to surround the vicinity of the valve port 10. The valve seat portion 15S projects in the upper direction, and a top portion of the valve seat portion 15S forms a valve seat surface 15a. The valve seat surface 15a is perpendicular to the axis line L1.

The valve body 14S is located in the valve body hole 12b of the housing 12G such that the tip end portion 14a is opposed to the valve seat portion 15S. When the valve body 14S moves in the lower direction to be located at the closed position, the tip end portion 14a is seated on the valve seat portion 15S. In contrast, when the valve body 14S moves in the upper direction to be located at the open position, the tip end portion 14a is separated from the valve seat portion 15S as shown in FIG. 20. In addition, the valve body 14S includes a pressure regulating seat member 11 located at the tip end portion 14a.

The pressure regulating seat member 11 is a substantially disc-shaped member made of rubber or resin, and an outer diameter thereof is larger than the diameter of the valve seat portion 15S, that is, the seat diameter $r_1$. The pressure regulating seat member 11 is provided so as to be opposed to the valve seat portion 15S, and a valve body surface 11a configured to be seated on the valve seat surface 15a of the valve seat portion 15S is formed perpendicular to the axis line L1. That is, the pressure regulating seat member 11 of the valve body 14S perpendicularly contacts the valve seat surface 15a.

The tip end portion 14a of the valve body 14S is formed to be larger in diameter than the other portion. The tip end portion 14a includes the flange 14e at an outer peripheral portion thereof. The flange 14e projects in a radially outward direction and extends along the entire periphery of the tip end portion 14a in the circumferential direction. The upper surface of the flange 14e is opposed to a ceiling surface defining the valve space 12e, and the return spring 26S is provided between the upper surface of the flange 14e and the ceiling surface. The return spring 26S is a so-called compression coil spring. The return spring 26S is externally attached to the valve body 14S in a compressed state and biases the valve body 14S in the lower direction that is the direction toward the closed position. By this biasing, the tip end portion 14a of the valve body 14S is seated on the valve seat portion 15S. Thus, the valve body 14S closes the valve passage 13.

The pressure return passage 35 formed in the housing 12G is configured such that the fuel gas having leaked to the buffer chamber 22 is returned through the pressure return passage 35 to the secondary region, such as the pressure return chamber 24G and the secondary passage 12f. To be specific, the electromagnetic pressure regulating valve 1S is configured as a valve having the safety structure by which the fuel gas having leaked from the primary region, such as the valve space 12e, can be returned to the secondary region without causing the leakage to the outside.

In the electromagnetic pressure regulating valve 1S configured as above, the primary pressure $p_1$ is reduced to the secondary pressure $p_2$ by an annular orifice 38 formed between the valve seat portion 15S and the valve body 14S, and the secondary pressure $p_2$ is introduced through the secondary passage 12f to the secondary port 12c. In the electromagnetic pressure regulating valve 1S, a region (the pressure receiving surface P3), located on an inner side of the orifice 38, of the tip end portion 14a of the valve body 14S receives the secondary pressure $p_2$ in the direction toward the open position, and an upper surface of the diaphragm seal 19G and a base end surface of the valve body 14S (that is, the pressure receiving surface P4) receive the secondary pressure P2 in the direction toward the closed position. The direction in which the pressure receiving surface P3 receives the secondary pressure $p_2$ and the direction in which the pressure receiving surface P4 receives the secondary pressure $p_2$ are opposed to each other.

In the electromagnetic pressure regulating valve 1S, the effective diameter $r_3$ of the diaphragm seal 19G is larger than the seat diameter $r_1$ (that is substantially equal to the diameter of the orifice 38), and the pressure receiving area A4 of the pressure receiving surface P4 is larger than the pressure receiving area A3 of the pressure receiving surface P3. Therefore, the acting force corresponding to the difference between the pressure receiving areas A3 and A4 of the pressure receiving surfaces P3 and P4 acts on the valve body 14S in the direction toward the closed position. Thus, as with the electromagnetic pressure regulating valve 1G according to Embodiment 8, the electromagnetic pressure regulating valve 1S is configured as a normally closed valve. The pressure receiving areas of the pressure receiving surfaces P1 and P2 are substantially equal to each other, so that the primary pressure $p_1$ received by the valve body 14S is canceled. Since the operations of the electromagnetic pressure regulating valve 1S are substantially the same as the operations of the electromagnetic pressure regulating valve 1G according to Embodiment 8, explanations thereof are omitted. The same is true for Embodiments 20 to 22 explained below.

In the electromagnetic pressure regulating valve 1S configured as above, both the valve seat surface 15a of the valve seat portion 15S and the valve body surface 11a of the valve body 14S are perpendicular to the axis line L1, that is, perpendicular to the direction toward the open position. Therefore, plastic deformation of the valve seat portion 15S or the pressure regulating seat member 11 in the direction toward the open position occurs by repeated use. On this account, even if the plastic deformation occurs, the seat diameter $r_1$ changes little. Therefore, the pressure regulating performance changes little eve if the electromagnetic pressure regulating valve 1S is repeatedly used. Thus, the reliability of the electromagnetic pressure regulating valve 1S and the stability of the pressure regulating performance can be improved.

As with the electromagnetic pressure regulating valve 1G according to Embodiment 8, the electromagnetic pressure regulating valve 1S is configured to have a pull-type structure in which the valve body 14S can be pulled upward by the electromagnetic proportional solenoid 27G to be moved in the direction toward the open position. Therefore, the electromagnetic proportional solenoid 27G can be provided outside the valve passage 13. On this account, in the electromagnetic pressure regulating valve 1S, while securing the same passage area of the secondary passage 12f as a push-type structure electromagnetic pressure regulating valve configured such that the electromagnetic proportional solenoid 27G is provided at the secondary passage 12f and the valve body 14S is pushed in the direction toward the open position, the diameter of the orifice 38 (that is, the seat diameter $r_1$) can be made smaller than that of the push-type structure electromagnetic pressure regulating valve. By making the seat diameter $r_1$ smaller as above, the amount of change in the opening degree of the valve passage 13 with respect to the change in the stroke of the valve body 14S reduces. Therefore, the electromagnetic pressure regulating valve 10 can adjust the opening degree of the valve passage 13 more precisely than the push-type structure electromagnetic gas pressure regulating valve. Thus, the stability and pressure regulating accuracy of the electromagnetic pressure regulating valve 1S can be improved.

Further, since the valve body 14S is a moving member, a seating position of the valve body 14S varies. Herein, the valve body surface 11a is seated on the projecting valve seat portion 15S. Therefore, even if the seating position varies to some extent, the valve body 14S can be surely seated on the valve seat portion 15S by making the valve body surface 11a of the valve body 14S larger than the valve seat portion 15S. In addition, since the valve seat portion 15S is formed along the outer edge of the valve port 10, an inner diameter of the valve port 10 and an inner diameter of the valve seat portion 15S are substantially equal to each other, and the seat diameter $r_1$ can be reduced while securing the necessary passage area. With this, the stability of the pressure regulating accuracy of the electromagnetic pressure regulating valve 1S can be improved.

A projection may be provided on the valve body surface 11a of the valve body 14S of the electromagnetic pressure regulating valve 15, that is, on a tip end of the valve body 14S. In this case, if an inner diameter of this projection is set to be equal to the inner diameter of the valve port 10, and the projection is seated on a position, such as the valve port 10, that is not a predetermined seating position, the valve port 10 may not be closed. Therefore, the inner diameter of the projection needs to be set to be larger than the inner diameter of the valve port 10 such that the valve port 10 can be surely closed.

The electromagnetic pressure regulating valve 1S according to Embodiment 19 has the same operational advantages as the electromagnetic pressure regulating valve 1G according to Embodiment 8.

Embodiment 20

The electromagnetic pressure regulating valve 1T according to Embodiment 20 of the present invention is similar in configuration to the electromagnetic pressure regulating valve 1S according to Embodiment 19. Hereinafter, only components different from those of the electromagnetic pressure regulating valve 1S according to Embodiment 19 will be explained. The same reference signs are used for the same components, and explanations thereof are omitted. The same is true for Embodiments 21 and 22 explained below.

Figure 21:
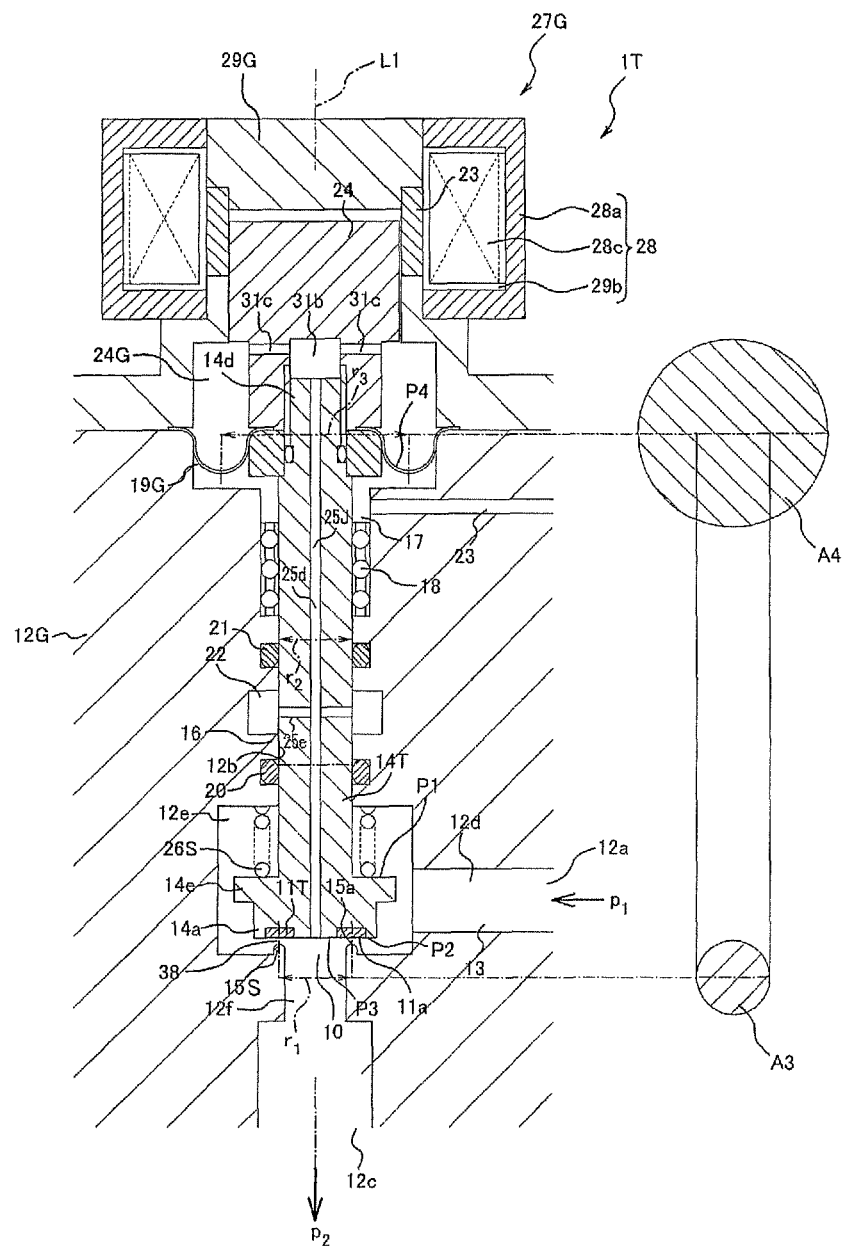
FIG. 21 is a cross-sectional view showing the configuration of an electromagnetic pressure regulating valve of Embodiment 20.

As with the valve body 14 of the electromagnetic pressure regulating valve 1J according to Embodiment 10, the pressure equalizing passage 25J is formed in a valve body 14T of the electromagnetic pressure regulating valve 1T according to Embodiment 20 of the present invention as shown in FIG. 21. The secondary passage 12f and the pressure return chamber 24G are connected to each other by the pressure equalizing passage 25J, and the secondary pressure $p_2$ is introduced to the pressure return chamber 24G. Then, as with the electromagnetic pressure regulating valve 1S according to Embodiment 19, in the electromagnetic pressure regulating valve 1T, the diaphragm seal 19G receives the secondary pressure $p_2$ of the pressure return chamber 24G, and the opening degree of the valve passage 13 is adjusted in accordance with the secondary pressure $p_2$. Thus, the secondary pressure $p_2$ is regulated. A pressure regulating seat member 11T is formed to have a substantially annular shape, surrounds a lower opening (that is, an opening facing the secondary passage 12f) of the pressure equalizing passage 25J, and is located to be slightly spaced apart from an outer edge of the opening.

In the electromagnetic pressure regulating valve 1T, the buffer chamber 22 is connected to the secondary passage 12f through the pressure equalizing passage 25J, and the fuel gas having leaked to the buffer chamber 22 is returned to the secondary passage 12f. Thus, the electromagnetic pressure regulating valve 1T is also configured as a valve having the safety structure by which the fuel gas having leaked through the high-pressure sealing member 20 is returned to the secondary side.

The electromagnetic pressure regulating valve 1T according to Embodiment 20 configured as above has the same operational advantages as the electromagnetic pressure regulating valve 1S according to Embodiment 19.

Embodiment 21

Figure 22:
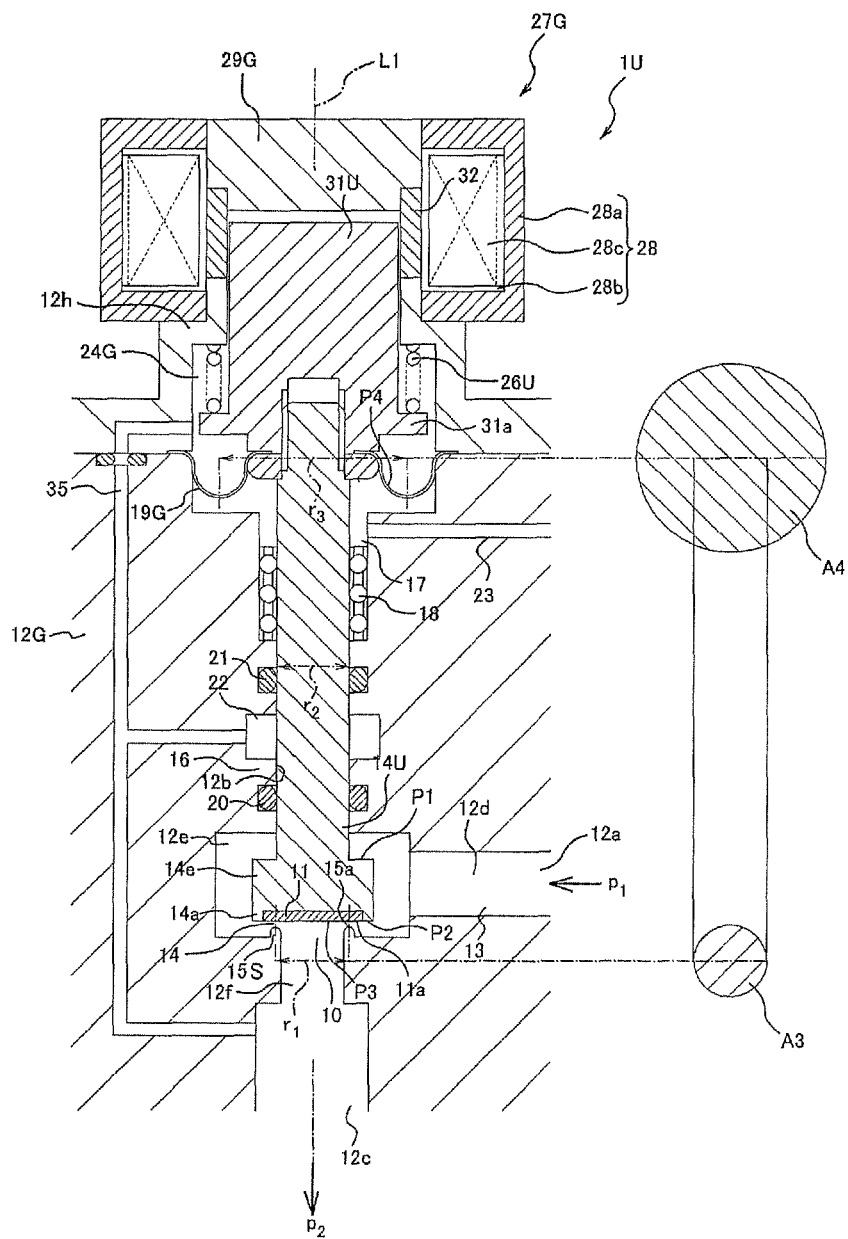
FIG. 22 is a cross-sectional view showing the configuration of an electromagnetic pressure regulating valve of Embodiment 21.

As with the electromagnetic pressure regulating valve 1G according to Embodiment 8, in the electromagnetic pressure regulating valve 1U according to Embodiment 21 of the present invention, a movable member 31U includes the flange 31a located on an outer peripheral surface portion thereof (see FIG. 22), and a return spring 26U is provided between the flange 31a and a spring receiving seat 12h of the housing 12, the spring receiving seat 12h being located to be opposed to the flange 31a. The return spring 26U is interposed between the spring receiving seat 12h and the flange 31a in a compressed state and biases the valve body 14U in the direction toward the closed position via the movable member 31U.

The electromagnetic pressure regulating valve 1U according to Embodiment 21 configured as above has the same operational advantages as the electromagnetic pressure regulating valve 1S according to Embodiment 19.

Embodiment 22

Figure 23:
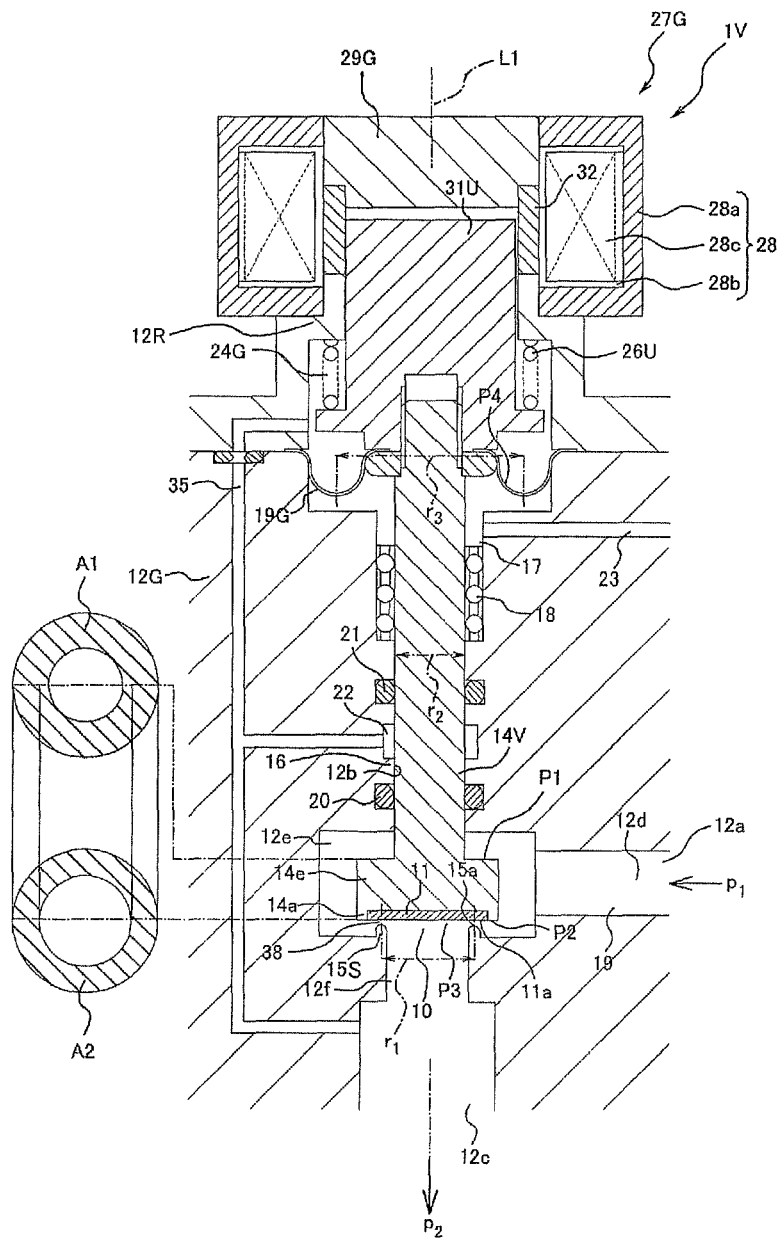
FIG. 23 is a cross-sectional view showing the configuration of an electromagnetic pressure regulating valve of Embodiment 22.

As shown in FIG. 23, in the electromagnetic pressure regulating valve 1V according to Embodiment 22 of the present invention, the outer diameter $r_2$ of a valve body 14V is smaller than the seat diameter $r_1$, and the pressure receiving area A1 of the pressure receiving surface P1 is larger than the pressure receiving area of the pressure receiving surface P2. Therefore, the acting force generated by the primary pressure $p_1$ corresponding to the difference between the pressure receiving areas A1 and A2 acts toward the closed position.

Since the acting force generated by the primary pressure $p_1$ acts toward the closed position, the sealing surface pressure between the valve body 14V and the seat portion of the valve seat portion 15S is high. When the electromagnetic proportional solenoid 27G does not operate, the valve body 14V is held at the closed position. Therefore, the valve passage 13 can be firmly closed, and the airtightness when the valve body 14V is being seated is improved.

The electromagnetic pressure regulating valve 1V according to Embodiment 22 has the same operational advantages as the electromagnetic pressure regulating valve 1S according to Embodiment 19.

Other Embodiment

In the present embodiment, the diaphragm seal 19 receives the secondary pressure $p_2$ of the pressure return chamber 24. However, the present embodiment is not limited to the diaphragm seal, and a low-pressure sealing member, such as an O ring, may be used.

In each of the electromagnetic pressure regulating valves 1S to 1V according to Embodiments 19 to 22, the outer diameter $r_2$ of each of the valve bodies 14S to 14V is substantially uniform except for the flange 14e and the portion which is threadedly engaged with the movable member 31G. However, an outer diameter of the portion supported by the bearing member 18 may be set to be larger than the outer diameter $r_2$. With this, since an inner diameter of the bearing member 18 can be increased, the straight movement performance of each of the valve bodies 14S to 14V can be improved, and variations of the seating position of each of the valve bodies 14S to 14V can be reduced. The same is true for the other embodiments.

In each of the electromagnetic pressure regulating valves 1S to 1V according to Embodiments 19 to 22, the seal diameter of the low-pressure sealing member 20 and the seal diameter of the high-pressure sealing member 21 are substantially equal to each other. However, the present embodiments are not limited to this. By setting the seal diameter of the low-pressure sealing member 21 to be larger than the seal diameter of the high-pressure sealing member 20, the base end portion of each of the valve bodies 14S to 14V can be increased in thickness, and the stiffness of each of the valve bodies 14S to 14V can be improved. With this, a stronger structure against disturbances can be realized. In contrast, by setting the seal diameter of the low-pressure sealing member 21 to be smaller than the seal diameter of the high-pressure sealing member 20, a force acting in the direction toward the closed position and generated by the secondary pressure $p_2$ introduced to the buffer chamber 22 can be caused to act on each of the valve bodies 14S to 14V. With this, the airtightness of the seat portion when each of the valve bodies 14S to 14V is held at the closed position can be further improved. The same is true for the other embodiments. The electromagnetic pressure regulating valves 1S to 1V according to Embodiments 19 to 22 have been explained by using the electromagnetic proportional solenoid 17 as the valve body driving unit. However, as with Embodiments 16 to 18, the piezoelectric element (piezo element) or the force motor may be adopted instead of the electromagnetic proportional solenoid 27G.

INDUSTRIAL APPLICABILITY

The present invention is applicable to a gas pressure regulating valve configured to regulate the pressure of a high-pressure fuel gas to pressure corresponding to an applied voltage or an applied current.

REFERENCE SIGNS LIST 1, 1A to 1N, 1S to 1V electromagnetic pressure regulating valve
1O to 1R pressure regulating valve
2 fuel gas supply system
12 housing
12a primary port
12c secondary port
13 valve passage
14, 14A to 14N, 14S to 14V valve body
17 bearing member accommodating space
18 bearing member
19, 19F, 19G diaphragm seal
20 high-pressure sealing member
21 low-pressure sealing member
22, 22B, 22G, 22H buffer chamber
24, 24F, 24G pressure return chamber
25, 25F, 25J pressure equalizing passage
26, 26G return spring
27, 27G electromagnetic proportional solenoid
27O, 27Q piezoelectric actuator
27P, 27R force motor

The invention claimed is:
1. A gas pressure regulating valve comprising:
a housing including a valve passage connected to a primary port and a secondary port;
a valve body provided in the housing and configured to move between a closed position where the valve body closes the valve passage and an open position where the valve body opens the valve passage to adjust an opening degree of the valve passage;
a return spring configured to bias the valve body in a direction toward the closed position; and
a valve body driving unit configured to apply a driving force corresponding to an applied voltage or an applied current to the valve body against the biasing of the return spring to cause the valve body to move in a direction toward the open position,
the gas pressure regulating valve being configured to regulate pressure of a high-pressure fuel gas, supplied through the primary port to the valve passage, to pressure corresponding to the driving force of the valve body driving unit to output the fuel gas through the secondary port,
the gas pressure regulating valve comprising:
a pressure return chamber formed in the housing and connected to the secondary port;
a first sealing member configured to receive pressure of the pressure return chamber in a direction against the driving force and cause the valve body to move toward the closed position in accordance with the pressure of the pressure return chamber;
a bearing member provided in a gap between the valve body and the housing and configured to slidingly support the valve body;

a second sealing member provided closer to the valve passage than the bearing member and configured to seal the gap; and a third sealing member provided closer to the valve passage than the second sealing member and configured to seal the gap, wherein a buffer chamber connected to the secondary port is formed between the third sealing member and the second sealing member.

2. The gas pressure regulating valve according to claim 1, wherein:

the secondary port and the pressure return chamber are connected to each other by a pressure return passage; and the pressure return passage is formed in the valve body.

3. The gas pressure regulating valve according to claim 1, wherein the valve body is formed such that a pressure receiving area of a first pressure receiving surface configured to receive primary pressure of the primary port toward the open position and a pressure receiving area of a second pressure receiving surface configured to receive the primary pressure toward the closed position are equal to each other.

4. The gas pressure regulating valve according to claim 1, wherein the valve body is formed such that a pressure receiving area of a first pressure receiving surface configured to receive primary pressure of the primary port toward the open position is smaller than a pressure receiving area of a second pressure receiving surface configured to receive the primary pressure toward the closed position.

5. The gas pressure regulating valve according to claim 1, wherein:

the pressure return chamber is provided on an opposite side of the second sealing member such that the pressure return chamber and the second sealing member sandwich the bearing member; and the first sealing member is located between the bearing member and the pressure return chamber to seal between the bearing member and the pressure return chamber.

6. The gas pressure regulating valve according to claim 1, wherein:

the pressure return chamber is located between the valve passage and the valve body driving unit; and the first sealing member is located between the valve body driving unit and the pressure return chamber to seal between the valve body driving unit and the pressure return chamber.

7. The gas pressure regulating valve according to claim 1, wherein:

the first sealing member is a diaphragm seal.

8. The gas pressure regulating valve according to claim 1, wherein the gas pressure regulating valve is a normally closed valve configured such that when the applied voltage or the applied current applied to the valve body driving unit is zero, the valve body is located at the closed position by the return spring.

9. The gas pressure regulating valve according to claim 1, wherein:

the secondary port and the pressure return chamber are connected to each other by a pressure return passage; and the pressure return passage is formed in the housing.

10. The gas pressure regulating valve according to claim 9, wherein the pressure return passage is connected to the buffer chamber.

11. The gas pressure regulating valve according to claim 1, wherein:

the housing includes a valve seat portion on which the valve body is seated when the valve body is located at the closed position, the valve seat portion including a valve seat surface perpendicular to the direction toward the open position; and a valve body surface of the valve body is seated on the valve seat surface, the valve body surface being perpendicular to the direction toward the open position.

12. The gas pressure regulating valve according to claim 11, wherein:

the valve passage includes a secondary passage connected to the secondary port located downstream of an orifice formed between the valve seat portion and the valve body; and the valve body driving unit is provided outside the secondary passage to be located on an opposite side of the valve seat portion such that the valve body driving unit and the valve seat portion sandwich the valve body, and the valve body driving unit pulls up the valve body by the driving force to cause the valve body to move in the direction toward the open position.

13. The gas pressure regulating valve according to claim 12, wherein:

the valve seat portion is formed along an outer edge of a valve port that is an opening of the secondary passage, the opening being located on the primary port side, and projects toward the valve body in the direction toward the open position;

the valve body includes a seat member located at a position opposed to the valve seat portion; and one surface of the seat member forms the valve body surface, and the valve body surface is seated on a top portion of the valve seat portion.

\* \* \* \* \*